(12) United States Patent
Yang et al.

(10) Patent No.: US 11,817,959 B2
(45) Date of Patent: Nov. 14, 2023

(54) CODEBOOK CONSTRUCTION FOR ENHANCED HYBRID AUTOMATIC REPEAT REQUEST FEEDBACK

(71) Applicant: QUALCOMM Incorporated, San Diego, CA (US)

(72) Inventors: Wei Yang, San Diego, CA (US); Yi Huang, San Diego, CA (US); Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/177,170

(22) Filed: Feb. 16, 2021

(65) Prior Publication Data
US 2021/0258102 A1 Aug. 19, 2021

Related U.S. Application Data

(60) Provisional application No. 62/978,709, filed on Feb. 19, 2020.

(51) Int. Cl.
*H04L 1/1812* (2023.01)

(52) U.S. Cl.
CPC .................. *H04L 1/1812* (2013.01)

(58) Field of Classification Search
CPC .... H04L 1/1854; H04L 1/1896; H04L 1/1607
See application file for complete search history.

(56) References Cited

U.S. PATENT DOCUMENTS

2018/0241510 A1 8/2018 Shen
2019/0007959 A1* 1/2019 Hwang ............. H04W 72/0446
(Continued)

FOREIGN PATENT DOCUMENTS

| WO | WO-2018204491 A1 | 11/2018 |
| WO | WO-2019063885 A1 | 4/2019 |
| WO | WO-2019139908 A1 | 7/2019 |

OTHER PUBLICATIONS

3GPP TS 38.213, "3rd Generation Partnership Project; Technical Specification Group Radio Access Network; NR; Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00.docx [retrieved on Jan. 14, 2020], section 7.6.2, Section 10.1; p. 100, Section 10.3, Paragraph [09.1]. clause 7.2.1; p. 23-p. 25, clause 9; p. 4 9, paragraph 3 clause 9.1; p. 49, paragraph 4—paragraph 15 clause 9.1.1; p. 50, paragraph 5—paragraph 6 clause 9.1.2.1; p. 55 clause 9.1.3; p. 57, paragraph 8 clause 9.1.3.1; p. 61, paragraph 1—paragraph 2 clause 9.1.3.2; p. 63, paragraph 6 clause 9.1.3.3; p. 64, paragraph 1—p. 65, paragraph 10, p. 56. paragraph 6—p. 57, paragraph 1 ch. 9.2.3, p. 73, paragraph, 5 p. 44, paragraph 8, p. 10, paragraph 1 p. 105-p. 106; tables 10.2-1. 10.2-2.
(Continued)

*Primary Examiner* — Abdullahi Ahmed
(74) *Attorney, Agent, or Firm* — Holland & Hart LLP/Qualcomm Incorporated

(57) ABSTRACT

Methods, systems, and devices for wireless communications are described to support codebook construction for enhanced hybrid automatic repeat request (HARQ) feedback. A user equipment (UE) may be configured to support a first type of
(Continued)

HARQ feedback and a second type of HARQ feedback that includes additional information relative to the first type. A base station may transmit multiple downlink transmissions to the UE, where a first set of the downlink transmissions may be associated with the first type of HARQ feedback and a second set of the downlink transmissions may be associated with the second type of HARQ feedback. The UE may attempt to decode the downlink transmissions and may generate respective feedback for the downlink transmissions. The UE may construct a single HARQ codebook to multiplex the different types of HARQ feedback for the downlink transmissions and may transmit the HARQ codebook to the base station.

28 Claims, 17 Drawing Sheets

(56) References Cited

U.S. PATENT DOCUMENTS

| | | | | |
|---|---|---|---|---|
| 2020/0059327 A1* | 2/2020 | Kini | ............... | H04L 5/0055 |
| 2020/0229179 A1* | 7/2020 | Fan | ............... | H04L 1/1864 |
| 2020/0374040 A1* | 11/2020 | Lou | ............... | H04L 1/1614 |
| 2020/0374045 A1* | 11/2020 | Yin | ............... | H04L 1/1854 |
| 2021/0135791 A1* | 5/2021 | Wang | ............... | H04L 1/0009 |
| 2021/0176011 A1* | 6/2021 | Lei | ............... | H04W 72/042 |
| 2021/0226740 A1* | 7/2021 | Lei | ............... | H04L 1/0079 |
| 2022/0159683 A1* | 5/2022 | Islam | ............... | H04W 72/23 |

OTHER PUBLICATIONS

International Search Report and Written Opinion—PCT/US2021/01836—ISA/EPO—dated May 28, 2021.

Qualcomm Incorporated: "TP for Enhancements to Scheduling and HARQ Operation for NR-U", 3GPP TSG RAN WG1 Meeting #100e, R1-2000958, 3rd Generation Partnership Project (3GPP) Feb. 15, 2020 (Feb. 15, 2020), XP051853533, Retrieved from the Internet: URL: https://ftp.3gpp.org/tsg_ran/WG1_RL1/TSGR1_100_e/Docs/R1 2000958.zip. [retrieved on Feb. 15, 2020], 6 Pages, the whole document.

Qualcomm Incorporated: "Ultra Reliable HARQ Design with Async CSI Feedback", 3GPP TSG-RAN WG1 #90, R1-1713455, 3rd Generation Partnership Project (3GPP) Aug. 20, 2017 (Aug. 20, 2017), XP051316257, Retrieved from the Internet: URL: http://www.3gpp.org/ftp/Meetings_3GPP_SYNC/RAN1/Docs/. [retrieved on Aug. 20, 2017], 5 Pages, the whole document.

\* cited by examiner

CODEBOOK CONSTRUCTION FOR ENHANCED HYBRID AUTOMATIC REPEAT REQUEST FEEDBACK

CROSS REFERENCE

The present Application for Patent claims the benefit of U.S. Provisional Patent Application No. 62/978,709 by YANG et al., entitled "CODEBOOK CONSTRUCTION FOR ENHANCED HYBRID AUTOMATIC REPEAT REQUEST FEEDBACK," filed Feb. 19, 2020, assigned to the assignee hereof, and expressly incorporated by reference herein.

FIELD OF TECHNOLOGY

The following relates generally to wireless communications and more specifically to codebook construction for enhanced hybrid automatic repeat request (HARQ) feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support codebook construction for enhanced hybrid automatic repeat request (HARQ) feedback. Generally, the described techniques provide for constructing HARQ codebooks when at least one carrier for a user equipment (UE) supports enhanced HARQ feedback, which may alternatively be referred to as super-ACK, super-HARQ-ACK, or turbo-ACK feedback, among other possible names. HARQ feedback may be used herein to refer to feedback messages that include only acknowledgement (e.g., acknowledgement/negative acknowledgement (ACK/NACK)) information (e.g., each HARQ feedback message may include a single bit of ACK/NACK information). In contrast, a super-ACK feedback message may include, along with ACK/NACK information, additional channel information that may further increase a likelihood of successful reception of an associated downlink transmission. Super-ACK feedback messages thus may each include multiple bits.

In some cases, a UE may be configured to support multiple types of feedback, such as multiple types of super-ACK feedback (e.g., different types of super-ACK feedback for which feedback messages include different types of information, different quantities of bits, or both), in addition to HARQ feedback. Further, in some cases, the UE may be configured to multiplex different types of feedback messages (e.g., to multiplex different types of super-ACK feedback messages or to multiplex HARQ and super-ACK feedback messages into a single codebook (or other single message)). In some cases, a base station may transmit multiple downlink transmissions to the UE, where radio resource control (RRC) information for downlink control information associated with a downlink transmission (e.g., associated with the downlink transmission individually, or associated with a carrier via which the downlink transmission is transmitted) may indicate whether feedback associated with the downlink transmission is to be super-ACK feedback or HARQ feedback. The UE may attempt to decode the downlink transmissions and may generate the respective feedback messages for the downlink transmissions. The UE may construct a single HARQ codebook to multiplex super-ACK feedback with HARQ feedback, or to multiplex multiple types of super-ACK feedback. The UE may transmit the HARQ codebook to the base station.

A HARQ codebook may be constructed using a semi-static configuration (e.g., may have a fixed size, which in some cases may be referred to as a Type 1 codebook or a semi-static codebook) or a dynamically indicated configuration (e.g., may have a dynamic size, which in some cases may be referred to as a Type 2 codebook or a dynamic codebook). When multiplexing super-ACK feedback (e.g., including multiple bits of information) with HARQ feedback (e.g., including one bit of information) according to a semi-static configuration, instances of HARQ feedback (e.g., HARQ feedback messages) may include dummy bits or repeated information bits in order to increase the number bits included in each instance of HARQ feedback to equal the number of bits (e.g., M bits) included in each instance of super-ACK feedback (e.g., super-ACK feedback messages). When multiplexing super-ACK feedback with HARQ feedback according to a dynamic configuration, the UE may generate a sub-codebook for each type of feedback and concatenate the two sub-codebooks into one combined codebook. Similar principles (e.g., dummy or repeated bits to equalize bit counts for each message, sub-codebooks and concatenation) may be applied when multiplexing different types of super-ACK feedback into a single HARQ codebook, regardless whether HARQ feedback is or is not also multiplexed into the HARQ codebook.

Alternatively, in some cases, a base station may be configured to schedule the UE such that the UE transmits super-ACK feedback and HARQ feedback over separate channels.

A method of wireless communication at a UE is described. The method may include receiving a first set of one or more downlink transmissions associated with a first HARQ configuration, where the first HARQ configuration corresponds to a first type of feedback message associated with a first quantity of one or more bits, receiving a second set of one or more downlink transmissions associated with a second HARQ configuration, where the second HARQ configuration corresponds to a second type of feedback message associated with a second quantity of multiple bits, and transmitting, to a base station and in response to the first set of downlink transmissions and the second set of downlink transmissions, a HARQ codebook that includes one or more feedback messages of the first type and one or more feedback messages of the second type.

An apparatus for wireless communication at a UE is described. The apparatus may include a processor, memory coupled with the processor, and instructions stored in the memory. The instructions may be executable by the processor to cause the apparatus to receive a first set of one or more downlink transmissions associated with a first HARQ configuration, where the first HARQ configuration corresponds to a first type of feedback message associated with a first quantity of one or more bits, receive a second set of one or more downlink transmissions associated with a second HARQ configuration, where the second HARQ configuration corresponds to a second type of feedback message associated with a second quantity of multiple bits, and transmit, to a base station and in response to the first set of downlink transmissions and the second set of downlink transmissions, a HARQ codebook that includes one or more feedback messages of the first type and one or more feedback messages of the second type.

Another apparatus for wireless communication at a UE is described. The apparatus may include means for receiving a first set of one or more downlink transmissions associated with a first HARQ configuration, where the first HARQ configuration corresponds to a first type of feedback message associated with a first quantity of one or more bits, receiving a second set of one or more downlink transmissions associated with a second HARQ configuration, where the second HARQ configuration corresponds to a second type of feedback message associated with a second quantity of multiple bits, and transmitting, to a base station and in response to the first set of downlink transmissions and the second set of downlink transmissions, a HARQ codebook that includes one or more feedback messages of the first type and one or more feedback messages of the second type.

A non-transitory computer-readable medium storing code for wireless communication at a UE is described. The code may include instructions executable by a processor to receive a first set of one or more downlink transmissions associated with a first HARQ configuration, where the first HARQ configuration corresponds to a first type of feedback message associated with a first quantity of one or more bits, receive a second set of one or more downlink transmissions associated with a second HARQ configuration, where the second HARQ configuration corresponds to a second type of feedback message associated with a second quantity of multiple bits, and transmit, to a base station and in response to the first set of downlink transmissions and the second set of downlink transmissions, a HARQ codebook that includes one or more feedback messages of the first type and one or more feedback messages of the second type.

Some examples of the method, apparatuses, and non-transitory computer-readable medium described herein may further include operations, features, means, or instructions for, where the HARQ codebook is a first type of codebook, generating, for each downlink transmission in the first set of downlink transmissions, a respective set of one or more filler bits, where the respective set of filler bits includes a third quantity of one or more filler bits that may be equal to a difference between the second quantity and first quantity, the second quantity greater than the first quantity, and including each generated set of one or more filler bits in the HARQ codebook.

In some examples of the method, apparatuses, and non-transitory computer-readable medium described herein, the first set of downlink transmissions and the second set of downlink transmissions may be received via a same downlink serving cell that supports the first HARQ configuration and the second HARQ configuration, where generating the respective sets of one or more filler bits may be based on the first set of downlink transmissions and the second set of downlink transmissions being received via the same downlink serving cell that supports the first HARQ configuration and the second HARQ configuration.

Some examples of the method, apparatuses, and non-transitory computer-readable medium described herein may further include operations, features, means, or instructions for receiving radio resource configuration information identifying a fixed size of the HARQ codebook.

Some examples of the method, apparatuses, and non-transitory computer-readable medium described herein may further include operations, features, means, or instructions for, where the HARQ codebook is a first type of codebook, generating, for each downlink transmission in the first set of downlink transmissions, a respective set of identical feedback messages of the first type, where each feedback message of the first type in the respective set includes the first quantity of bits, and where the respective set of identical feedback messages collectively includes the second quantity of bits and may be included in the HARQ codebook.

Some examples of the method, apparatuses, and non-transitory computer-readable medium described herein may further include operations, features, means, or instructions for, where the HARQ codebook is a first type of codebook, identifying a failure to decode a grant for a downlink transmission occasion, generating, for the downlink transmission occasion, a respective discontinuous communication message that includes the second quantity of bits regardless of whether the downlink transmission occasion may be associated with the first HARQ configuration or the second HARQ configuration, and including the respective discontinuous communication message in the HARQ codebook.

Some examples of the method, apparatuses, and non-transitory computer-readable medium described herein may further include operations, features, means, or instructions for, where the HARQ codebook is a first type of codebook, receiving a grant for an uplink transmission via an uplink shared channel, where the HARQ codebook may be transmitted via the uplink shared channel based on an indicator included in the grant for the uplink transmission.

Some examples of the method, apparatuses, and non-transitory computer-readable medium described herein may further include operations, features, means, or instructions for, where the HARQ codebook is a second type of codebook, generating a first sub-codebook for each downlink transmission in the first set of downlink transmissions, the first sub-codebook including a respective feedback message of the first type for each downlink transmission in the first set of downlink transmissions, generating a second sub-codebook for each downlink transmission in the second set of downlink transmissions, the second sub-codebook including a respective feedback message of the second type for each downlink transmission in the second set of downlink transmissions, and concatenating the first-sub-codebook and the second sub-codebook, where generating the HARQ codebook may be based on the concatenating.

Some examples of the method, apparatuses, and non-transitory computer-readable medium described herein may further include operations, features, means, or instructions for identifying, based on corresponding downlink control information (DCI), each downlink transmission in one of the first set of downlink transmissions or the second set of downlink transmissions as associated with one of the first HARQ configuration or the second HARQ configuration.

Some examples of the method, apparatuses, and non-transitory computer-readable medium described herein may further include operations, features, means, or instructions for receiving, for each downlink transmission in one of the first set of downlink transmissions or the second set of downlink transmissions, a respective downlink assignment indicator (DAI), and incrementing DAIs associated with the second set of downlink transmissions independent of DAIs associated with the first set of downlink transmissions.

Some examples of the method, apparatuses, and non-transitory computer-readable medium described herein may further include operations, features, means, or instructions for receiving DCI identifying a size of the first sub-codebook and a size of the second sub-codebook, and determining a size of the HARQ codebook as equal to the sum of the size of the first sub-codebook and the size of the second sub-codebook.

Some examples of the method, apparatuses, and non-transitory computer-readable medium described herein may further include operations, features, means, or instructions for receiving a grant for an uplink transmission via an uplink shared channel, where the grant for the uplink transmission includes a first indicator that indicates a size of the first sub-codebook and a second indicator that indicates a size of the second sub-codebook, and determining a size for the HARQ codebook based on the first indicator and the second indicator, where the HARQ codebook may be transmitted via the uplink shared channel based on the grant for the uplink transmission.

Some examples of the method, apparatuses, and non-transitory computer-readable medium described herein may further include operations, features, means, or instructions for generating, for each downlink transmission in the first set of downlink transmissions, a respective set of first feedback bits, where the respective set of first feedback bits includes the first quantity of bits and may be included in the one or more feedback messages of the first type, and generating, for each downlink transmission in the second set of downlink transmissions, a respective set of second feedback bits, where the respective set of second feedback bits includes the second quantity of bits and may be included in the one or more feedback messages of the second type.

Some examples of the method, apparatuses, and non-transitory computer-readable medium described herein may further include operations, features, means, or instructions for receiving, via DCI or radio resource control information, an indication of whether the one or more feedback messages of the first type and one or more feedback messages of the second type may be included in a same HARQ codebook, where generating the HARQ codebook may be based on the indication.

Some examples of the method, apparatuses, and non-transitory computer-readable medium described herein may further include operations, features, means, or instructions for receiving a third set of one or more downlink transmissions associated with a third HARQ configuration, where the third HARQ configuration corresponds to a third type of feedback message, receiving scheduling information from the base station, generating, in response to the third set of downlink transmissions and the scheduling information, a second HARQ codebook that includes one or more feedback messages of the third type, and transmitting the second HARQ codebook to the base station, where the second HARQ codebook may be transmitted separately from the HARQ codebook.

In some examples of the method, apparatuses, and non-transitory computer-readable medium described herein, the first set of downlink transmissions may be received over a first carrier associated with the first HARQ configuration, and the second set of downlink transmissions may be received over a second carrier associated with the second HARQ configuration.

In some examples of the method, apparatuses, and non-transitory computer-readable medium described herein, a feedback message of the first type includes ACK/NACK information, and a feedback message of the second type includes ACK/NACK information and channel quality information (CQI).

In some examples of the method, apparatuses, and non-transitory computer-readable medium described herein, the HARQ codebook may be transmitted within a single transmission time interval.

In some examples of the method, apparatuses, and non-transitory computer-readable medium described herein, the first type of feedback message and the second type of feedback message include a same type of feedback message that includes ACK/NACK information and CQI.

A method of wireless communication at a base station is described. The method may include transmitting a first set of one or more downlink transmissions associated with a first HARQ configuration, where the first HARQ configuration corresponds to a first type of feedback message associated with a first quantity of one or more bits, transmitting a second set of one or more downlink transmissions associated with a second HARQ configuration, where the second HARQ configuration corresponds to a second type of feedback message associated with a second quantity of multiple bits, and receiving, in response to the first set of downlink transmissions and the second set of downlink transmissions, a HARQ codebook that includes one or more feedback messages of the first type and one or more feedback messages of the second type.

An apparatus for wireless communication at a base station is described. The apparatus may include a processor, memory coupled with the processor, and instructions stored in the memory. The instructions may be executable by the processor to cause the apparatus to transmit a first set of one or more downlink transmissions associated with a first HARQ configuration, where the first HARQ configuration corresponds to a first type of feedback message associated with a first quantity of one or more bits, transmit a second set of one or more downlink transmissions associated with a second HARQ configuration, where the second HARQ configuration corresponds to a second type of feedback message associated with a second quantity of multiple bits, and receive, in response to the first set of downlink transmissions and the second set of downlink transmissions, a HARQ codebook that includes one or more feedback messages of the first type and one or more feedback messages of the second type.

Another apparatus for wireless communication at a base station is described. The apparatus may include means for transmitting a first set of one or more downlink transmissions associated with a first HARQ configuration, where the first HARQ configuration corresponds to a first type of feedback message associated with a first quantity of one or more bits, transmitting a second set of one or more downlink transmissions associated with a second HARQ configuration, where the second HARQ configuration corresponds to a second type of feedback message associated with a second quantity of multiple bits, and receiving, in response to the first set of downlink transmissions and the second set of downlink transmissions, a HARQ codebook that includes one or more feedback messages of the first type and one or more feedback messages of the second type.

A non-transitory computer-readable medium storing code for wireless communication at a base station is described. The code may include instructions executable by a processor to transmit a first set of one or more downlink transmissions associated with a first HARQ configuration, where the first HARQ configuration corresponds to a first type of feedback message associated with a first quantity of one or more bits, transmit a second set of one or more downlink transmissions associated with a second HARQ configuration, where the second HARQ configuration corresponds to a second type of feedback message associated with a second quantity of multiple bits, and receive, in response to the first set of downlink transmissions and the second set of downlink transmissions, a HARQ codebook that includes one or more feedback messages of the first type and one or more feedback messages of the second type.

Some examples of the method, apparatuses, and non-transitory computer-readable medium described herein may further include operations, features, means, or instructions for configuring the HARQ codebook to be a first type of codebook, determining that the one or more feedback messages of the first type each include a respective set of one or more filler bits based on configuring the HARQ codebook to be the first type of codebook, where the respective set of filler bits includes a third quantity of one or more filler bits that may be equal to a difference between the second quantity and first quantity, the second quantity greater than the first quantity, and decoding the one or more feedback messages of the first type based on determining that the one or more feedback messages of the first type each include a respective set of one or more filler bits.

Some examples of the method, apparatuses, and non-transitory computer-readable medium described herein may further include operations, features, means, or instructions for transmitting radio resource configuration information that indicates a fixed size of the HARQ codebook.

Some examples of the method, apparatuses, and non-transitory computer-readable medium described herein may further include operations, features, means, or instructions for configuring the HARQ codebook to be a first type of codebook, determining that the one or more feedback messages of the first type each include a respective set of identical feedback messages of the first type based on configuring the HARQ codebook to be the first type of codebook, where each feedback message of the first type in the respective set includes the first quantity of bits, and where the respective set of identical feedback messages collectively includes the second quantity of bits and may be included in the HARQ codebook, and decoding the one or more feedback messages of the first type based on determining that the one or more feedback messages of the first type each include a respective set of identical feedback messages of the first type.

Some examples of the method, apparatuses, and non-transitory computer-readable medium described herein may further include operations, features, means, or instructions for configuring the HARQ codebook to be a first type of codebook, transmitting a grant for a downlink transmission occasion, and receiving, in the HARQ codebook, a discontinuous communication message associated with the downlink transmission occasion, where the discontinuous communication message includes the second quantity of bits regardless of whether the downlink transmission occasion may be associated with the first HARQ configuration or the second HARQ configuration.

Some examples of the method, apparatuses, and non-transitory computer-readable medium described herein may further include operations, features, means, or instructions for configuring the HARQ codebook to be a first type of codebook, and transmitting a grant for a user equipment to transmit an uplink transmission via an uplink shared channel, where the grant includes an indicator for the user equipment to transmit the HARQ codebook via the uplink shared channel.

Some examples of the method, apparatuses, and non-transitory computer-readable medium described herein may further include operations, features, means, or instructions for configuring the HARQ codebook to be a second type of codebook, receiving, as part of the HARQ codebook, a first sub-codebook for each downlink transmission in the first set of downlink transmissions, the first sub-codebook including a respective feedback message of the first type for each downlink transmission in the first set of downlink transmissions, and receiving, as part of the HARQ codebook, a second sub-codebook for each downlink transmission in the second set of downlink transmissions, the second sub-codebook including a respective feedback message of the second type for each downlink transmission in the second set of downlink transmissions, where the first-sub-codebook and the second sub-codebook may be concatenated.

Some examples of the method, apparatuses, and non-transitory computer-readable medium described herein may further include operations, features, means, or instructions for transmitting DCI that indicates one of the first HARQ configuration or the second HARQ configuration for each downlink transmission in one of the first set of downlink transmissions or the second set of downlink transmissions.

Some examples of the method, apparatuses, and non-transitory computer-readable medium described herein may further include operations, features, means, or instructions for transmitting, for each downlink transmission in one of the first set of downlink transmissions or the second set of downlink transmissions, a respective DAI, where DAIS associated with the second set of downlink transmissions may be incremented independent of DAIS associated with the first set of downlink transmissions.

Some examples of the method, apparatuses, and non-transitory computer-readable medium described herein may further include operations, features, means, or instructions for transmitting DCI that indicates a size of the first sub-codebook and a size of the second sub-codebook.

Some examples of the method, apparatuses, and non-transitory computer-readable medium described herein may further include operations, features, means, or instructions for transmitting a grant for a user equipment to transmit an uplink transmission via an uplink shared channel, where the grant includes a first indicator that indicates a size of the first sub-codebook and a second indicator that indicates a size of the second sub-codebook, where the HARQ codebook may be received via the uplink shared channel based on the grant for the uplink transmission.

Some examples of the method, apparatuses, and non-transitory computer-readable medium described herein may further include operations, features, means, or instructions for receiving, in the one or more feedback messages of the first type and for each downlink transmission in the first set of downlink transmissions, a respective set of first feedback bits that includes the first quantity of bits and may be included in the one or more feedback messages of the first type, and receiving, in the one or more feedback messages of the first type and for each downlink transmission in the second set of downlink transmissions, a respective set of second feedback bits that includes the second quantity of bits and may be included in the one or more feedback messages of the second type.

Some examples of the method, apparatuses, and non-transitory computer-readable medium described herein may further include operations, features, means, or instructions for transmitting, via DCI or radio resource control information, an indication of whether a user equipment may include the one or more feedback messages of the first type and one or more feedback messages of the second type in a same HARQ codebook.

Some examples of the method, apparatuses, and non-transitory computer-readable medium described herein may further include operations, features, means, or instructions for transmitting a third set of one or more downlink transmissions associated with a third HARQ configuration, where the third HARQ configuration corresponds to a third type of feedback message, transmitting scheduling information to the UE, and receiving, in response to the third set of downlink transmissions and the scheduling information, a second HARQ codebook that includes one or more feedback messages of the third type, where the second HARQ codebook may be transmitted separately from the HARQ codebook.

In some examples of the method, apparatuses, and non-transitory computer-readable medium described herein, the first set of downlink transmissions may be transmitted over a first carrier associated with the first HARQ configuration, and the second set of downlink transmissions may be transmitted over a second carrier associated with the second HARQ configuration.

In some examples of the method, apparatuses, and non-transitory computer-readable medium described herein, a feedback message of the first type includes ACK/NACK information, and a feedback message of the second type includes ACK/NACK information and CQI.

In some examples of the method, apparatuses, and non-transitory computer-readable medium described herein, the HARQ codebook may be received within a single transmission time interval.

In some examples of the method, apparatuses, and non-transitory computer-readable medium described herein, the first type of feedback message and the second type of feedback message include a same type of feedback message that includes ACK/NACK information and CQI.

DETAILED DESCRIPTION

Figure 1:
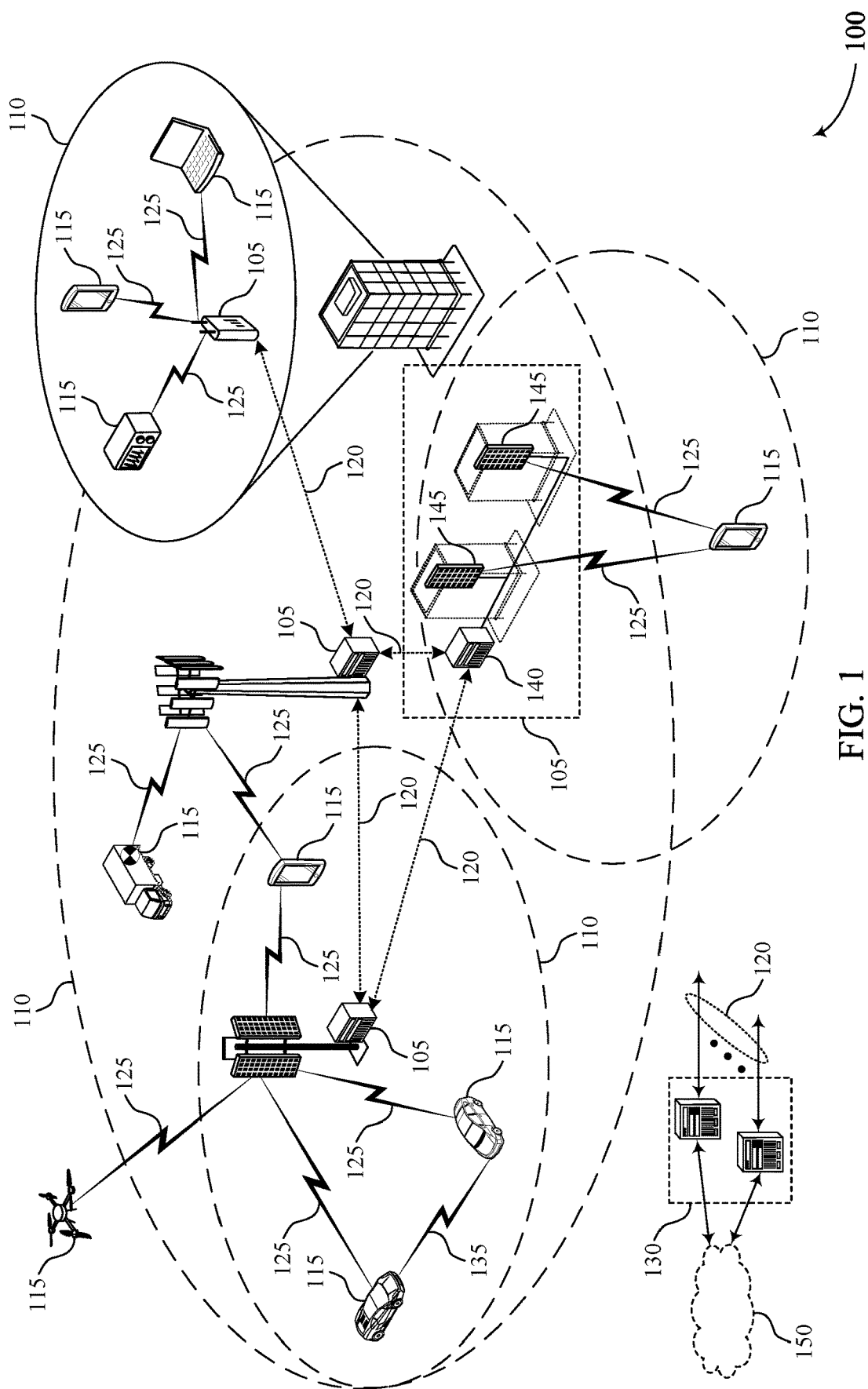
FIG. 1 illustrates an example of a wireless communications system that supports codebook construction for enhanced hybrid automatic repeat request (HARQ) feedback in accordance with aspects of the present disclosure.

A base station may transmit downlink transmissions to a user equipment (UE), which the UE may attempt to decode. Based on the results of attempting to decode a downlink transmission, the UE may determine and transmit to the base station a feedback message that includes acknowledgement (ACK/NACK) information, where an ACK indicates a successful decode and a NACK indicates a failure to decode a corresponding downlink transmission. HARQ feedback may be used herein to refer to feedback messages that include only acknowledgement (e.g., ACK/NACK) information (e.g., each HARQ feedback message may include a single bit of ACK/NACK information).

Generally, the described techniques provide for constructing HARQ codebooks when at least one carrier for a UE supports enhanced HARQ feedback, which may alternatively be referred to as super-ACK, super-HARQ-ACK, or turbo-ACK feedback, among other possible names. In contrast to HARQ feedback messages, super-ACK feedback messages may each include, along with acknowledgement (e.g., ACK/NACK) information, additional channel information that may further increase a likelihood of successful reception of an associated downlink transmission. Super-ACK feedback messages thus may each include multiple bits.

The base station may configure the UE (e.g., carriers used by the UE) to support super-ACK feedback, HARQ feedback, or both. Where super-ACK is utilized, the base station may use the additional channel information of the super-ACK feedback to retransmit one or more of the downlink transmissions, for example, if the super-ACK feedback indicates that the one or more downlink transmissions were not successfully received.

In some cases, the UE may be configured to multiplex multiple types of super-ACK feedback or to multiplex HARQ and super-ACK feedback. The UE may construct a single HARQ codebook to multiplex super-ACK feedback with HARQ feedback, or to multiplex multiple types of super-ACK feedback. The base station may transmit multiple downlink transmissions to the UE, where a downlink control information (DCI) message or radio resource control (RRC) information associated with a respective downlink transmission may indicate whether feedback associated with the downlink transmission is super-ACK feedback or HARQ feedback. The UE may attempt to decode the downlink transmissions and may generate the respective feedback for the downlink transmissions. For example, the UE may construct a codebook (e.g., a HARQ codebook) that combines the feedback for the downlink transmissions, for multiplexing and transmission to the base station.

A HARQ codebook may be constructed using a semi-static configuration (e.g., may have a fixed size or number of feedback occasions, which may be referred as a Type 1 codebook) or a dynamically indicated configuration (e.g., may have a dynamic size or number of feedback occasions, which may be referred as a Type 2 codebook). The UE may generate a semi-statically configured codebook by generating multiple bits (e.g., M bits) of super-ACK feedback for each super-ACK feedback occasion in the codebook, where the number of bits (e.g., M bits) for a super-ACK feedback occasion of the semi-static codebook may be configured by the base station. The UE may construct a dynamic codebook for a downlink transmission based on a corresponding DCI message, where the DCI message may indicate a codebook size. In such cases, the UE may generate multiple bits (e.g., M bits) of super-ACK feedback for each associated downlink transmission (e.g., and associated DCI message).

After generating the multiple bits of super-ACK feedback for any downlink transmission associated with super-ACK feedback, the UE may multiplex the super-ACK feedback in one codebook for transmission to the base station. In some cases, the codebook may include multiple types of super-ACK feedback, and in some cases, the codebook may include HARQ feedback and one or more types of super-ACK feedback.

When multiplexing super-ACK feedback (e.g., including multiple bits of information) with HARQ feedback (e.g., including one bit of information) (or a second type of super ACK feedback) according to a semi-static configuration, instances of HARQ feedback (or the second type of super ACK feedback) may include dummy bits or repeated information bits up to a number of bits (e.g., M bits) included in each instance of super-ACK feedback. When multiplexing super-ACK feedback with HARQ feedback (or a second type of super ACK feedback) according to a dynamic configuration, the UE may generate a sub-codebook for each type of feedback and concatenate the two sub-codebooks into one combined codebook. Alternatively, in some cases, the UE may be configured to transmit different types of feedback messages (e.g., super-ACK feedback and HARQ feedback) over separate control channels. In some cases, the UE may transmit a multiplexed feedback codebook on a shared data channel.

The base station may receive the multiplexed feedback (e.g., multiple super-ACK feedbacks or super-ACK feedback and HARQ feedback) via the codebook and may determine whether the UE has successfully received one or more of the downlink transmissions based on the codebook. If the base station determines to retransmit a downlink transmission associated with super-ACK feedback, the base station may further identify and use additional channel information from the codebook to increase a probability of successful reception of the retransmission at the UE.

Aspects of the disclosure are initially described in the context of wireless communications systems. Aspects of the disclosure are further illustrated by and described with reference to codebook determination schemes, a process flow, apparatus diagrams, system diagrams, and flowcharts that relate to codebook construction for enhanced HARQ feedback.

FIG. 1 illustrates an example of a wireless communications system 100 that supports codebook construction for enhanced HARQ feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully (e.g., received via a physical downlink shared channel (PDSCH)). HARQ feedback is one technique for increasing the likelihood that data or control information is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, HARQ feedback messages may include ACK/NACK information, indicating whether associated data or an associated message (e.g., control message) has been successfully received. An ACK may indicate successful reception of a message and a NACK may indicate that one or more portions of a message have not been successfully received. For example, one HARQ ACK/NACK bit may be generated for each transport block (TB) or code block group (CBG) of a data transmission.

In some cases, a base station 105 may schedule a UE 115 to transmit multiple HARQ feedback messages (e.g., corresponding to multiple downlink transmissions) in a same TTI (e.g., slot). The UE 115 may multiplex the multiple HARQ feedback messages in a same codebook and may transmit the codebook to the base station 105. A codebook may represent a sequence of bits, where each combination of bits represents a HARQ feedback value for the multiple HARQ feedback messages. A type of codebook may indicate a codebook size (e.g., number of bits) and may align the codebook at the base station 105 and the UE 115. A semi-static codebook may be referred to herein as a Type 1 codebook and may have a fixed size (e.g., determined or configured by one or more RRC parameters). For HARQ feedback associated with a Type 1 codebook, the UE 115 and the base station 105 may determine a location and/or size of the codebook based on a configured rule (e.g., regardless of a number or amount of HARQ feedback bits to be transmitted by the UE 115). A dynamic codebook may be referred to herein as a Type 2 codebook and a size of the codebook may vary for each transmission of HARQ feedback. The size of the dynamic codebook may be indicated by the base station 105 when scheduling a downlink transmission associated with the HARQ feedback (e.g., indicated by a downlink assignment indicator (DAI) in a downlink grant).

In one example, the base station 105 may configure the UE 115 to report enhanced HARQ feedback that, along with ACK/NACK information, may include additional information to support retransmissions of downlink transmissions or downlink data from the base station 105. This type of feedback may be referred to as super-HARQ, super-HARQ-ACK, super-ACK, turbo HARQ, which are merely non-limiting examples of possible names for such feedback. It is to be understood that any of these or other terms may be used to describe HARQ feedback that includes additional information beyond ACK/NACK information, and that description of enhanced HARQ feedback in the present disclosure is not necessarily limited to any of these terms. For example, enhanced HARQ feedback may be referred to by any other term, and the description of the enhanced HARQ feedback in the present disclosure may equally apply to similar feedback described by any other term.

The additional information associated with super-ACK feedback may include channel quality information (CQI), modulation coding scheme (MCS) information, or channel state information (CSI), among other examples. For example, super-ACK feedback may associate or bundle CQI and/or CSI feedback with ACK/NACK information for one or more downlink transmissions. The super-ACK feedback may increase adaption of an MCS, a coding rate, a transmission power, or the like at the base station 105, for example, for retransmissions of the one or more downlink transmissions. In some cases, super-ACK may support a threshold reliability value (e.g., a $10^{-5}$ reliability) with one retransmission of a downlink transmission. As such, super-ACK may support one or more low-latency and/or high-reliability wireless services (e.g., a URLLC service).

Super-ACK feedback may include multiple bits of information to support transmission of the additional information to the base station 105. For example, a first multi-bit codepoint value (e.g., '00') for super-ACK feedback may indicate a successful decoding attempt (e.g., an ACK) for a TB or a CBG of a downlink transmission (e.g., downlink data transmission). As another example, a second multi-bit codepoint value (e.g., '01') for super-ACK feedback may indicate an unsuccessful decoding attempt (e.g., a NACK) and may further report that a CQI for a retransmission of the downlink transmission is a same value as for the original transmission. The second codepoint value may indicate that a log likelihood ratio (LLR) of the original transmission supports a likelihood of a successful retransmission, and therefore the base station 105 may use a same MCS for the retransmission.

As another example, a third multi-bit codepoint value (e.g., '10') for super-ACK feedback may indicate a NACK and may further report that a CQI for a retransmission of the downlink transmission is lower than a CQI for the original transmission by a given amount (e.g., the CQI is lower by an amount X, which may have a value of one in some cases). The third codepoint value may indicate that an LLR of the original transmission is lower than an LLR for a successful retransmission. Based on the lower CQI indicated by the third codepoint value, the base station 105 may use a lower MCS for the retransmission (e.g., may lower the MCS by a value of two). And as another example, a fourth multi-bit codepoint value (e.g., '11') for super-ACK feedback may indicate a NACK and may further report that a CQI for a retransmission of the downlink transmission 215 is much lower than a CQI for the original transmission by a given amount (e.g., the CQI is lower by an amount Y, which may have a value of two in some cases). The fourth codepoint value may indicate that an LLR of the original transmission is much lower than an LLR for a successful retransmission. Based on the lower CQI indicated by the fourth codepoint value, the base station 105 may use a lower MCS for the retransmission (e.g., may lower the MCS by a value of five).

In one example, a UE 115 may be configured to support super-ACK feedback (e.g., in addition to HARQ feedback). In some cases, the UE 115 may be configured to multiplex multiple types of super-ACK feedback or to multiplex HARQ and super-ACK feedback (e.g., into single HARQ codebook, to be transmitted within a single slot or other TTI on a single channel). A base station 105 may transmit multiple downlink transmissions to the UE 115, where a DCI message associated with a respective downlink transmission may indicate whether feedback associated with the downlink transmission is super-ACK feedback or HARQ feedback. The UE 115 may attempt to decode the downlink transmissions and may generate the respective feedback for downlink transmissions. The UE 115 may construct a single HARQ codebook to multiplex super-ACK feedback with HARQ feedback, or to multiplex multiple types of super-ACK feedback, and may transmit the HARQ codebook to the base station 105.

A super-ACK codebook may be constructed using a semi-static configuration (e.g., may have a fixed size, or number of feedback occasions) or a dynamically indicated configuration (e.g., may have a dynamic size, or number of feedback occasions). When multiplexing super-ACK feedback (e.g., including multiple bits of information) with HARQ feedback (e.g., including one bit of information) (or with another type of super-ACK feedback) according to a semi-static configuration, instances of HARQ feedback may include dummy bits or repeated information bits up to a number of bits (e.g., M bits) included in each instance of super-ACK feedback. When multiplexing super-ACK feedback with HARQ feedback (or with another type of super-ACK feedback) according to a dynamic configuration, the UE 115 may generate a sub-codebook for each type of feedback and concatenate the two sub-codebooks into one combined codebook. In some cases, the UE 115 may be configured to transmit super-ACK feedback and HARQ feedback over separate control channels. In some cases, the UE 115 may transmit a multiplexed feedback codebook on a shared data channel. It is to be understood that any techniques described herein for multiplexing HARQ feedback with super-ACK feedback may be similarly utilized to multiplex one type of super-ACK feedback for which each feedback message includes a first number of bits with one or more other types of super-ACK feedback for which each feedback message includes a second number of bits that is fewer than the first number.

Figure 2:
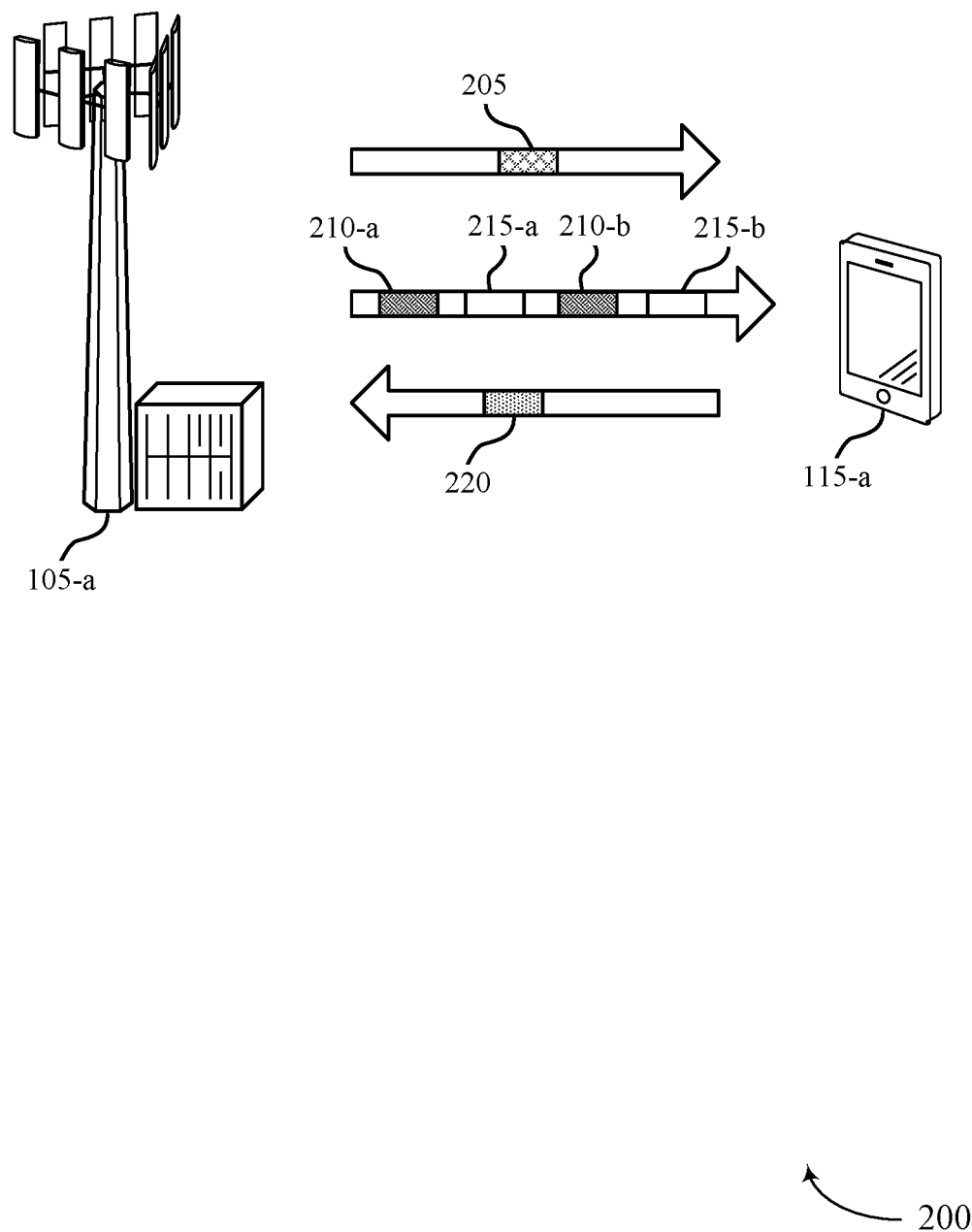
FIG. 2 illustrates an example of a wireless communications system that supports codebook construction for enhanced HARQ feedback in accordance with aspects of the present disclosure.

FIG. 2 illustrates an example of a wireless communications system 200 that supports codebook construction for enhanced HARQ feedback in accordance with aspects of the present disclosure. In some examples, wireless communications system 200 may implement aspects of wireless communications system 100. For example, wireless communications system 200 may include a base station 105-$a$ and a UE 115-$a$, which may be examples of a base station 105 and a UE 115 described with reference to FIG. 1. Base station 105-$a$ may transmit multiple downlink transmissions 215 to UE 115-$a$, which UE 115-$a$ may attempt to decode. Based on a result of the decoding attempt(s), UE 115-$a$ may determine one or more bits of feedback information (e.g., HARQ feedback) to transmit to base station 105-$a$ to support retransmissions of the downlink transmissions 215. UE 115-$a$ may be configured to support super-ACK feedback (e.g., in addition to HARQ feedback) for at least some downlink transmissions 215 and thereby increase a likelihood of successful reception of associated retransmissions.

In some cases, UE 115-$a$ may be configured to multiplex multiple types of super-ACK feedback or to multiplex HARQ and super-ACK feedback into a single HARQ codebook (e.g., when in carrier aggregation and one carrier may be restricted to HARQ, or if configured carriers may otherwise differ in terms of supported HARQ configurations, or in some scheduling scenarios). A HARQ codebook may refer to a set or collection of feedback messages that include at least ACK/NACK information for a set of corresponding downlink transmissions, where the HARQ codebook may be transmitted within a single TTI (e.g., slot) on a single channel or otherwise as part of a single transmission. The present disclosure provides techniques for constructing a single HARQ codebook that may multiplex super-ACK feedback with HARQ feedback, or may multiplex multiple types of super-ACK feedback. Base station 105-$a$ may configure UE 115-$a$ to support super-ACK feedback, HARQ feedback, or both. For example, base station 105-$a$ may transmit an RRC message 205 to UE 115-$a$, where the RRC message 205 may configure UE 115-$a$ to support super-ACK feedback and HARQ feedback. When the UE 115-$a$ is configured with multiple carriers (carrier aggregation), the RRC message 205 may also indicate to UE 115-$a$ which carriers or other configurations are associated with super-ACK feedback, HARQ feedback, or both.

Base station 105-$a$ may transmit multiple downlink transmissions 215 to UE 115-$a$, where the downlink transmissions 215 may be associated with super-ACK feedback or with one of super-ACK feedback or HARQ feedback. For example, base station 105-$a$ may transmit a DCI message 210-$a$ to schedule a downlink transmission 215-$a$ and may transmit a DCI message 210-$b$ to schedule a downlink transmission 215-$b$. Each DCI message 210 may indicate (e.g., based on a DCI format or a field of a DCI) whether feedback associated with the corresponding downlink transmission 215, or associated with the DCI message 210, is super-ACK feedback or HARQ feedback.

As described herein, feedback may be associated with a downlink transmission 215, a DCI message 210, or both. For example, UE 115-$a$ may perform feedback for a DCI message 210 (e.g., a physical downlink control channel (PDCCH) transmission) that indicates release of semi-persistently scheduled (SPS) resources or that indicates dormancy for a secondary cell (SCell), for example, without the DCI message scheduling a downlink transmission 215 (e.g., a PDSCH). In these and other cases, a DCI message 210 may represent a downlink transmission 215, or a portion thereof. UE 115-$a$ may perform HARQ feedback for DCI messages 210 (e.g., DCI messages 210 that do not schedule a corresponding downlink transmission 215), and in such cases, may use a first type of feedback message, which may be associated with HARQ feedback.

In a first example, DCI 210-$a$ may indicate that downlink transmission 215-$a$ (e.g., and DCI message 210-$a$) is associated with super-ACK feedback and DCI 210-$b$ may indicate that downlink transmission 215-$b$ (e.g., and DCI message 210-$b$) is associated with HARQ feedback. In a second example, DCI 210-$a$ may indicate that downlink transmission 215-$a$ is associated with super-ACK feedback and DCI 210-$b$ may indicate that downlink transmission 215-$b$ is associated with super-ACK feedback. UE 115-$a$ may attempt to decode downlink transmissions 215-$a$ and 215-$b$ and may generate the respective feedback for downlink transmissions 215-$a$ and 215-$b$ (e.g., and corresponding DCI messages 210-$a$ and 210-$b$). In some cases, downlink transmissions 215-$a$ and 215-$b$ may be transmitted by base station 105-$a$ on different carriers or according to different configurations. UE 115-$a$ may construct a codebook (e.g., a HARQ codebook) that combines the feedback messages for multiplexing and transmission to base station 105-$a$.

A super-ACK codebook may be constructed using a semi-static configuration (e.g., a Type 1 codebook) or a dynamically indicated configuration (e.g., a Type 2 codebook based on a DAI). UE 115-$a$ may determine a semi-statically configured codebook (e.g., a fixed-size codebook) based on each downlink transmission 215 (e.g., based on each PDSCH occasion). For example, for each downlink transmission 215, UE 115-$a$ may generate multiple bits (e.g., M bits) of super-ACK feedback for each TB or for each CBG. The number of bits (e.g., M) for the semi-static codebook may be configured by base station 105-$a$, for example, via RRC message 205, and may be different for different carriers (e.g., different carriers may have different super-ACK configurations). If a carrier for transmitting downlink transmission 215-$a$ or 215-$b$ is not configured to support super-ACK feedback, UE 115-$a$ may not expect to generate or transmit more than one bit of HARQ feedback per TB or CBG and may accordingly not generate super-ACK feedback. Techniques for generating a codebook for semi-statically configured codebooks are further described herein with reference to FIG. 3.

UE 115-a may determine a dynamically indicated codebook for a downlink transmission 215 based on a DAI included in a corresponding DCI message 210. UE 115-a may generate multiple bits (e.g., M bits) of super-ACK feedback for each downlink transmission 215 (e.g., and associated DCI message 210). A DAI may also indicate a total number of downlink transmissions 215 for which UE 115-a is to report super-ACK feedback and UE 115-a may use a DAI to determine if UE 115-a missed a downlink transmission 215 or corresponding DCI message 210. In such cases, UE 115-a may also generate multiple bits (e.g., M bits) of super-ACK feedback for each missed downlink transmission 215 (e.g., as determined based on the DAI). Techniques for generating a codebook for dynamically configured codebooks are further described herein with reference to FIG. 4.

After generating the multiple bits of super-ACK feedback (e.g., for either or both of downlink transmission 215-a and downlink transmission 215-b), UE 115-a may use one of the methods described herein to multiplex the feedback for downlink transmissions 215-a and 215-b (e.g., into one codebook). UE 115-a may transmit the codebook for downlink transmissions 215-a and 215-b to base station 105-a, for example, via feedback message 220. In some cases, the codebook may include multiple types of super-ACK feedback, and in some cases, the codebook may include both HARQ feedback and super-ACK feedback. For example, UE 115-a may report HARQ feedback if a carrier does not support super-ACK feedback, if UE 115-a encounters a link failure (e.g., or other connection problem) on a carrier that supports super-ACK feedback, or if RRC parameters have not yet been configured on a carrier that supports super-ACK feedback, among other examples.

When multiplexing super-ACK feedback (e.g., including multiple bits of information per downlink transmission 215) with HARQ feedback (e.g., including one bit of information per downlink transmission 215) according to a semi-static configuration, instances of HARQ feedback may include dummy bits or repeated information bits up to a number of bits (e.g., M bits) included in each instance of super-ACK feedback. When multiplexing super-ACK feedback with HARQ feedback according to a dynamic configuration, UE 115-a may generate a sub-codebook for each type of feedback and concatenate the two sub-codebooks into one combined codebook.

In some cases, UE 115-a may be configured (e.g., based on a configuration for scheduling downlink transmissions 215) to transmit super-ACK feedback and HARQ feedback in separate control channels (e.g., physical uplink control channels (PUCCHs)). For example, UE 115-a may transmit super-ACK feedback via the feedback message 220 on a first control channel and may transmit HARQ feedback via a second feedback message (not shown) on a second control channel.

In some cases, as described in more detail elsewhere herein, UE 115-a may transmit a multiplexed feedback codebook on a shared data channel (e.g., a physical uplink shared channel (PUSCH)).

Base station 105-a may receive the super-ACK feedback via the codebook included in the feedback message 220 and may determine whether UE 115-a has successfully received downlink transmissions 215-a and/or 215-b based on the codebook. For example, base station 105-a may determine an ACK/NACK value corresponding to each downlink transmission 215. Base station 105-a may determine to retransmit one or more of the downlink transmissions 215 based on the respective ACK/NACK value. For example, base station 105-a may determine to retransmit a downlink transmission 215 associated with a NACK value in the codebook. If base station 105-a determines to retransmit a downlink transmission 215 associated with super-ACK feedback, base station 105-a may further identify and use additional channel information (e.g., CSI, CQI, or MCS information) from the codebook to increase a probability of successful reception of the retransmission at UE 115-a. For example, base station 105-a may increase an MCS of the retransmission if the codebook indicates that the CQI is lower than the original downlink transmission 215.

Figure 3:
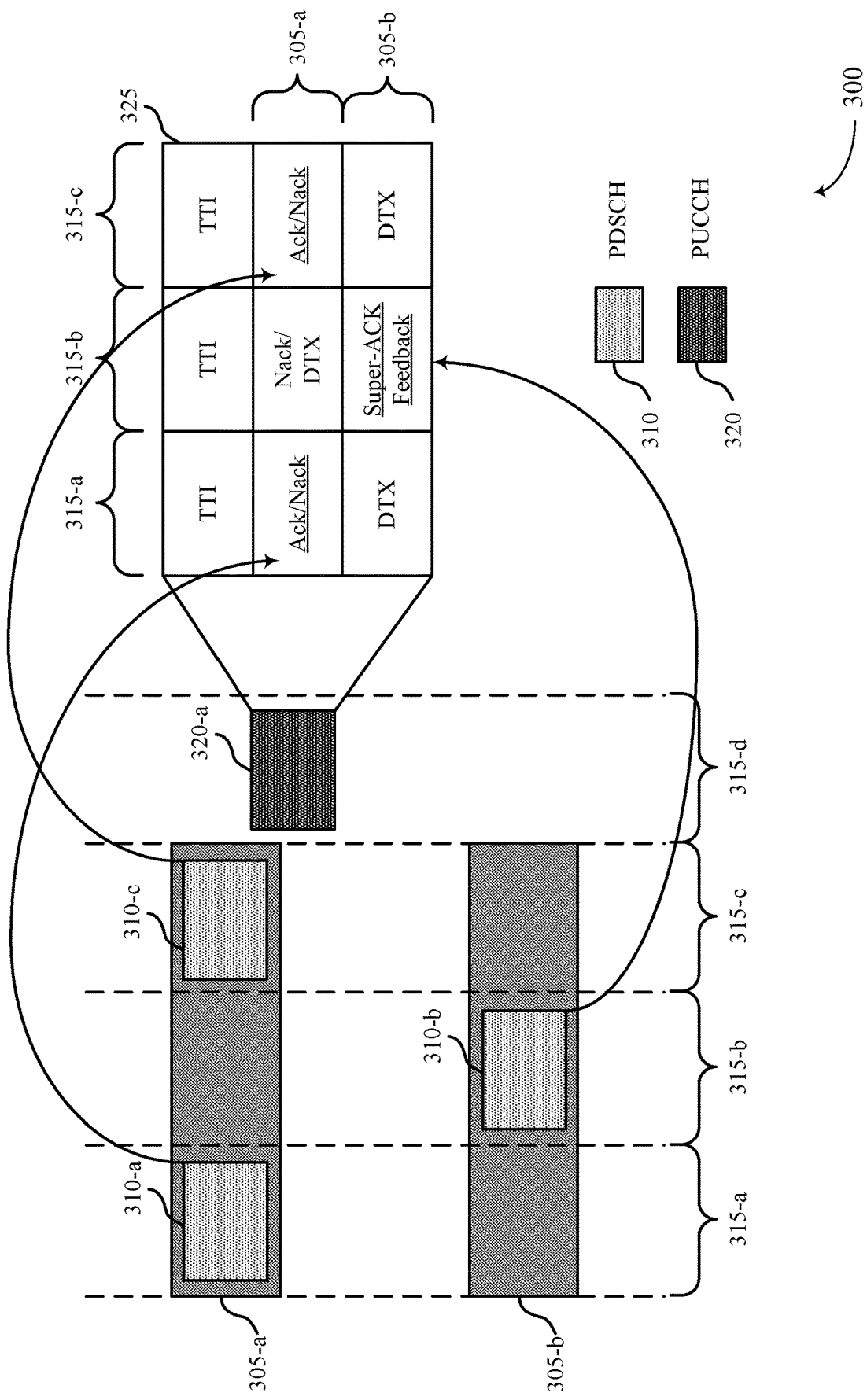
FIG. 3 illustrates an example of a codebook determination scheme that supports codebook construction for enhanced HARQ feedback in accordance with aspects of the present disclosure.

FIG. 3 illustrates an example of a codebook determination scheme 300 that supports codebook construction for enhanced HARQ feedback in accordance with aspects of the present disclosure. In some examples, codebook determination scheme 300 may implement aspects of wireless communication systems 100 or 200. For example, a UE 115 may implement codebook determination scheme 300 to determine a codebook for super-ACK feedback for multiple downlink transmissions transmitted from a base station 105, where the UE 115 and the base station 105 may be examples of a UE 115 and a base station 105 described with reference to FIGS. 1 and 2. The UE 115 may be configured by the base station 105 (e.g., via RRC signaling) with a semi-static (e.g., fixed) codebook size for the super-ACK feedback and may construct the codebook according to methods described herein.

The base station 105 may transmit multiple downlink transmissions (e.g., PDSCH instances) to the UE 115 over two carriers 305 (e.g., serving cells). The UE 115 may be configured to report super-ACK feedback for at least one PDSCH 310 and to multiplex the super-ACK feedback with feedback from the one or more other PDSCHs 310. In some cases, the one or more other PDSCHs 310 may be associated with super-ACK feedback, while in some other cases, the one or more other PDSCHs 310 may be associated with HARQ feedback. While the example illustrated by FIG. 3 shows some of the PDSCHs 310 received on different carriers 305, it is to be understood that similar techniques may be applied to PDSCHs 310 received on a same carrier 305. In some cases, the PDSCHs 310 may represent SPS PDSCHs 310 (e.g., PDSCHs 310 that are semi-statically configured and are not associated with a PDCCH scheduling grant).

In some cases, the base station 105 may transmit the PDSCHs 310 to the UE 115 in different TTIs 315 (e.g., different slots). For example, the base station 105 may transmit a PDSCH 310-a in a TTI 315-a, a PDSCH 310-b in a TTI 315-b, and a PDSCH 310-c in a TTI 315-c. The UE 115 may attempt to receive or decode the PDSCHs 310 (e.g., based on one or more grants previously received from the base station 105) and may generate feedback based on the decoding attempt(s). For example, the UE 115 may generate a single codebook 325 that includes feedback for each of the PDSCHs 310.

In some cases, the feedback may include super-ACK feedback and HARQ feedback. For example, PDSCHs 310-a and 310-c may be associated with HARQ feedback (e.g., if carrier 305-a is not configured for super-ACK feedback for the UE 115) and PDSCH 310-b may be associated with super-ACK feedback. The UE 115 may generate multiple bits (e.g., M bits) of super-ACK feedback for PDSCH 310-b, as described herein with reference to FIGS. 1 and 2, and may generate a respective single bit of HARQ feedback for each of PDSCHs 310-a and 310-c.

In a first example, carrier 305-a may be configured to support both super-ACK feedback and HARQ feedback, and PDSCHs 310-a and 310-c may be associated with HARQ feedback. In order to generate the codebook 325, the UE 115 may modify the HARQ feedback instances for PDSCHs 310-a and 310-c to include a same number of bits as the super-ACK feedback (e.g., M bits). In a first example, the UE 115 may include extra dummy bits or padded bits (e.g., M−1 dummy bits) with the HARQ feedback to form multiple bits of feedback (e.g., M bits of feedback). In a second example, the UE 115 may repeat the single bit for the HARQ feedback a number of times (e.g., M times) that is equal to the number of bits of the super-ACK feedback. The UE 115 may combine the modified HARQ feedback bits and the super-ACK feedback bits into one codebook 325 and may transmit the codebook 325 to the base station via a control channel occasion (e.g., a PUCCH 320).

In a second example, carrier 305-a may be configured to support HARQ feedback (e.g., may not be configured to support or may otherwise be unassociated with super-ACK feedback), and PDSCHs 310-a and 310-c may be associated with HARQ feedback. In order to generate the codebook 325, the UE 115 may include only HARQ feedback in the codebook 325 for each of PDSCHs 310-a and 310-c. For example, the UE 115 may generate a first quantity of bits for HARQ feedback based on the HARQ feedback occasions (e.g., may generate one bit of feedback for PDSCHs 310-a and 310-c) and may generate a second quantity of bits for super-ACK feedback based on the super-ACK feedback occasions (e.g., may generate M bits of feedback for PDSCH 310-b).

In some cases, the UE 115 may include an indication of a discontinuous communication or discontinuous transmission (DTX) in the super-ACK feedback. For example, the UE 115 may determine that, for a given TTI 315 and carrier 305 (e.g., a PDSCH occasion or resource), no PDSCH 310 has been scheduled by a received grant. Based on such a determination, the UE 115 may generate an indication of DTX for the TTI 315 and the carrier 305 in which no PDSCH 310 is scheduled and may include the indication of DTX in the super-ACK feedback. In such cases, the UE 115 may feedback multiple bits of super-ACK feedback to represent the DTX occasion. For example, if the super-ACK feedback includes M bits, there may exist $2^M$ codepoints available for super-ACK feedback and one of the $2^M$ codepoints may indicate a DTX occasion.

In some cases, carrier 305-a may be configured to support both HARQ feedback and super-ACK feedback, and PDSCHs 310-a and 310-c may be associated with HARQ feedback. As such, the UE 115 may report HARQ feedback for PDSCHs 310-a and 310-c as described herein (e.g., report M bits of repeated or padded feedback), and may report a DTX occasion for carrier 305-a in TTI 315-b. In other cases, however, carrier 305-a may be configured to support HARQ feedback (e.g., may not be configured to support or may otherwise be unassociated with super-ACK feedback), and thus carrier 305-a may not support an indication of DTX. In such cases, the UE 115 may generate (e.g., one bit of) HARQ feedback (e.g., a NACK) when the UE 115 does not expect a PDSCH 310 scheduled by a downlink grant. The base station 105 may receive the HARQ feedback, which in some cases may be a same feedback as if the UE 115 were to fail decoding a PDSCH 310.

The UE 115 may transmit the codebook 325 that includes the super-ACK feedback (e.g., and possible modified HARQ feedback) to the base station 105 via a PUCCH 320-a. In some cases (e.g., if PUCCH 320-a overlaps in time with a PUSCH transmission), the UE 115 may transmit the codebook 325 via a PUSCH or may transmit a portion of the codebook 325 via the PUSCH. For example, an uplink grant scheduling the PUSCH may include a DAI (e.g., a one bit DAI) that indicates whether the UE 115 may transmit the codebook or a portion of the codebook on the PUSCH. For example, a field in the uplink grant may have a value of '0' to indicate that the codebook 325 (e.g., or a portion thereof) may not be transmitted via the PUSCH or may have a value of '1' to indicate that the codebook 325 (e.g., or a portion thereof) may be transmitted via the PUSCH. In some cases, the portion of the codebook that may be transmitted via the PUSCH may be the super-ACK feedback or may be the HARQ feedback.

The base station 105 may receive the codebook 325 included in PUCCH 320-a (e.g., or the PUSCH) and may determine whether the UE 115 has successfully received PDSCHs 310-a, 310-b, and 310-c based on the codebook 325. The base station 105 may retransmit any PDSCHs 310 that may be unsuccessfully received by the UE 115, as indicated in the codebook 325. The base station 105 may use the super-ACK feedback in the codebook to modify any corresponding retransmitted PDSCHs 310, as described with reference to FIGS. 1 and 2.

Figure 4:
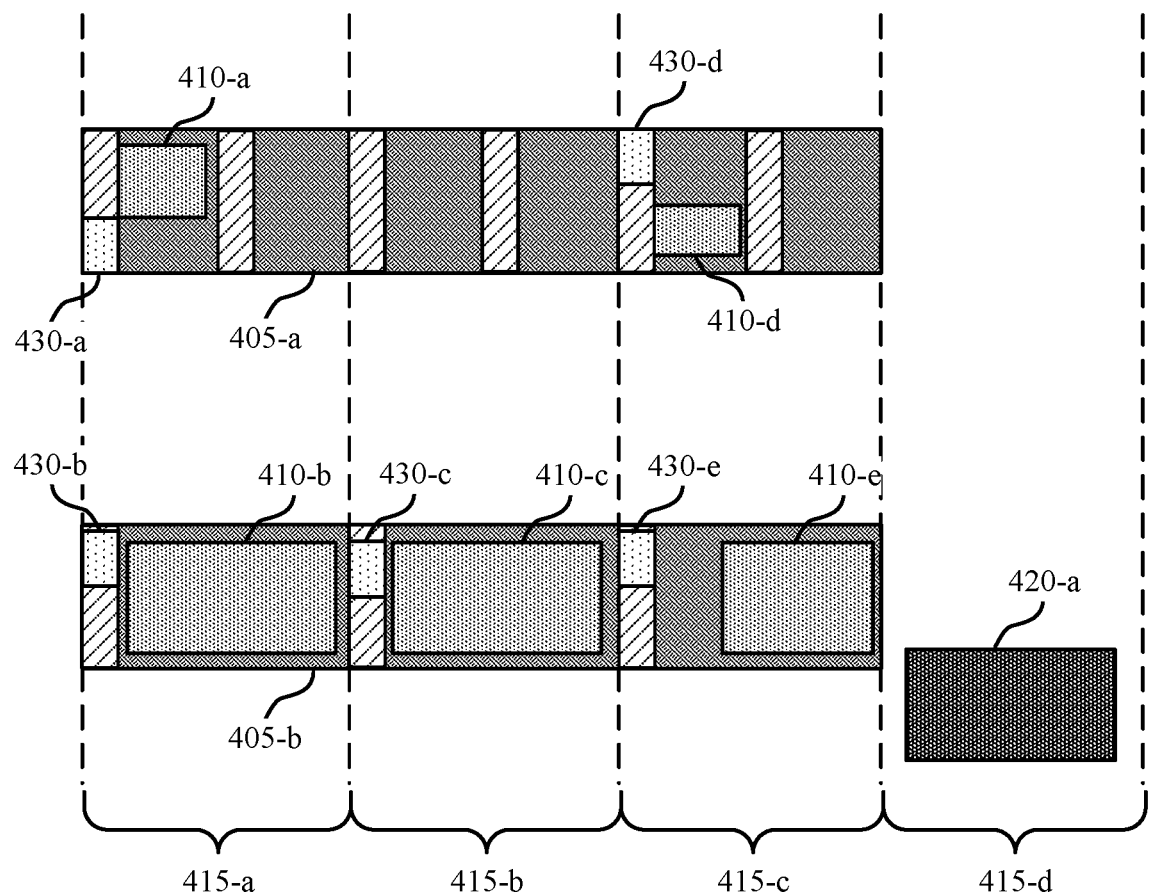
FIG. 4 illustrates an example of a codebook determination scheme that supports codebook construction for enhanced HARQ feedback in accordance with aspects of the present disclosure.

FIG. 4 illustrates an example of a codebook determination scheme 400 that supports codebook construction for enhanced HARQ feedback in accordance with aspects of the present disclosure. In some examples, codebook determination scheme 400 may implement aspects of wireless communication systems 100 or 200. For example, a UE 115 may implement codebook determination scheme 400 to determine a codebook for super-ACK feedback for multiple downlink transmissions transmitted from a base station 105, where the UE 115 and the base station 105 may be examples of a UE 115 and a base station 105 described with reference to FIGS. 1-3.

The base station 105 may transmit multiple downlink transmissions (e.g., PDSCH or PDCCH instances) to the UE 115 over two carriers 405. The base station may schedule the PDSCHs 410 using respective DCI messages (e.g., PDCCH instances or DCI) that the UE 115 may receive by monitoring a channel bandwidth in a PDCCH monitoring occasion 425. The UE 115 may be configured to report super-ACK feedback for at least one PDSCH 410 and to multiplex the super-ACK feedback with feedback from the one or more other PDSCHs 410. In some cases, the UE 115 may be configured to report super-ACK feedback for at least one PDCCH 430 (e.g., DCI message received via a PDCCH) and to multiplex the super-ACK feedback with feedback from the one or more other PDCCHs 430. In some cases, the one or more other PDSCHs 410 may be associated with super-ACK feedback, while in some other cases, the one or more other PDSCHs 410 may be associated with HARQ feedback.

While the examples illustrated by FIG. 4 shows some of the PDSCHs 410 received on different carriers 405, it is to be understood that similar techniques may be applied to PDSCHs 410 received on a same carrier 405. Similarly, while the examples described herein with reference to FIG. 4 describe feedback for one or more PDSCHs 410, it is to be understood that similar techniques may be applied to feedback for one or more PDCCHs 430 (e.g., DCIs).

In some cases, the base station 105 may transmit the PDCCHs 430 and the PDSCHs 410 to the UE 115 in various TTIs 415 (e.g., slots). For example, the base station 105 may transmit PDCCHs 430-*a* and 430-*b* in a TTI 415-*a*, a PDCCH 430-*c* in a TTI 415-*b*, and PDCCHs 430-*d* and 430-*e* in a TTI 415-*c*, where the PDCCHs 430 may schedule a corresponding PDSCH 410 in a same TTI 415. The UE 115 may attempt to receive or decode the PDSCHs 410 (e.g., based on the PDCCHs 430 received from the base station 105) and may generate feedback based on the decoding attempt(s). For example, the UE 115 may generate a single codebook that includes feedback for each of the PDSCHs 410.

In some cases, the feedback may include super-ACK feedback and HARQ feedback. For example, PDSCHs 410-*a* and 410-*d* may be associated with HARQ feedback (e.g., if carrier 405-*a* is not configured for super-ACK feedback for the UE 115) and PDSCHs 410-*b*, 410-*c*, and 410-*e* may be associated with super-ACK feedback. The UE 115 may generate multiple bits (e.g., M bits) of super-ACK feedback for PDSCHs 410-*b*, 410-*c*, and 410-*e*, as described herein with reference to FIGS. 1 and 2, and may generate a respective single bit of HARQ feedback for each of PDSCHs 410-*a* and 410-*d*.

In order to generate the codebook, the UE 115 may generate one sub-codebook that includes HARQ feedback (e.g., a first sub-codebook) and one sub-codebook that includes super-ACK feedback (e.g., a second sub-codebook). For example, an associated PDCCH 430 may indicate whether a scheduled feedback for a PDSCH 410 belongs to the first sub-codebook (e.g., is associated with HARQ feedback) or to the second sub-codebook (e.g., is associated with super-ACK feedback). The UE 115 may therefore use each decoded PDCCH 430 to determine a HARQ mode of transmission for each respective PDSCH 410. The UE 115 may determine the feedback for each of the two sub-codebooks based on an indicated or configured format of the feedback, may concatenate the two sub-codebooks, and may transmit the concatenated sub-codebooks in one transmission to the base station 105 (e.g., via PUCCH 420-*a*).

Each sub-codebook may be generated using DAI information from the corresponding PDCCHs 430. The DAI information may indicate a total number of PDSCHs 410 for the UE 115 over a number of TTIs 415 and a counter of a corresponding PDSCH 410. When two sub-codebooks are configured for feedback from the UE 115, the total number of PDSCHs 410 may be incremented separately (e.g., independently) for the two different types of sub-codebooks (e.g., for HARQ feedback and for super-ACK feedback). For example, PDCCH 430-*a* may indicate a total value of one and a counter value of one (e.g., where the total corresponds to a total number of HARQ-configured PDSCHs 410 in TTI 415-*a*). Similarly, PDCCH 430-*b* may indicate a total value of one and a counter value of one (e.g., where the total corresponds to a total number of super-ACK-configured PDSCHs 410 in TTI 415-*a*).

In one example, the UE 115 may miss or fail to decode PDCCH 430-*c*, and may therefore fail to receive PDSCH 410-*c*. However, if the UE 115 decodes PDCCH 430-*e*, the UE 115 may determine that a counter and a total value indicated by PDCCH 430-*e* are equal to three. Thus, the UE 115 may determine that the UE 115 missed or failed to decode a PDCCH 430 that indicated a counter and/or total value of two. And in some cases, because PDCCHs 430-*b* and 430-*e* both schedule PDSCHs 410 associated with super-ACK feedback, the UE 115 may determine that the missing PDCCH 430 (e.g., PDCCH 430-*c*) also schedules a PDSCH 410 associated with super-ACK feedback. Accordingly, the UE 115 may generate super-ACK feedback for the missed PDCCH 430-*c* and corresponding PDSCH 410-*c*.

For example, the UE 115 may generate bits representing an indication of DTX (e.g., M bits), which may indicate to the base station 105 that the UE 115 has failed to decode PDCCH 430-*c* (e.g., the downlink grant).

The UE 115 may generate a first sub-codebook of HARQ feedback that includes feedback for each of PDSCHs 410-*a* and 410-*d* (e.g., one bit of feedback for each PDSCH 410, or two total bits). The UE 115 may also generate a second sub-codebook of super-ACK feedback for each of PDSCHs 410-*b*, 410-*c*, and 410-*e* (e.g., M bits of feedback for each PDSCH 410, or 3M total bits). The UE 115 may concatenate the two sub-codebooks to form a joint codebook that includes all of the feedback from the PDSCHs 410 (e.g., 2+3M total bits of feedback) and may transmit the codebook to the base station via PUCCH 420-*a*.

In some cases (e.g., if PUCCH 420-*a* overlaps in time with a PUSCH transmission), the UE 115 may transmit the codebook via a PUSCH or may transmit a portion of the codebook via the PUSCH. For example, an uplink grant scheduling the PUSCH may include two DAI values, where one DAI value corresponds to a respective sub-codebook and indicates a size of the sub-codebook (e.g., indicates a number of feedback instances associated with the sub-codebook). The UE 115 may follow the respective DAI values to determine a size for each of the sub-codebooks and may generate the sub-codebooks and the codebook using the information in the DAI values. For example, a DAI for the first sub-codebook may indicate a sub-codebook size of two and a DAI for the second sub-codebook may indicate a sub-codebook size of three, and the UE 115 may construct the sub-codebooks accordingly.

The base station 105 may receive the codebook included in PUCCH 420-*a* (e.g., or the PUSCH) and may determine whether the UE 115 has successfully received PDSCHs 410-*a*, 410-*b*, 410-*c*, 410-*d*, and 410-*e* based on the codebook. The base station 105 may retransmit any PDSCHs 410 that may be unsuccessfully received by the UE 115, as indicated by the codebook. The base station 105 may use the super-ACK feedback in the codebook to modify any corresponding retransmitted PDSCHs 410, as described with reference to FIGS. 1 and 2.

In one example, if the UE 115 indicates a DTX for a scheduled PDSCH 410 (e.g., indicating that the PDSCH 410 and/or corresponding PDCCH 430 was not received), the base station 105 may reschedule the PDSCH 410 using a redundancy version of the PDSCH 410 (e.g., where the redundancy version may be self-decodable). For example, the base station 105 may determine (e.g., based on the indication of DTX) that the PDCCH 430 associated with the DTX was not correctly decoded by the UE 115, and the initial transmission of the associated PDSCH 410 is not received by the UE 115 such that the UE 115 may be unable to combine the initial transmission with a retransmission of the PDSCH 410. Therefore, the base station 105 may transmit a self-decodable version of the PDSCH 410 such that the UE 115 may correctly decode the retransmitted PDSCH 410 without combining the retransmission with another transmission (e.g., the missed, initial PDSCH 410).

In such cases, the base station 105 may set a new data indication (NDI) field in a grant (e.g., PDCCH 430) for the retransmission to have a same value as an NDI in the missed grant. For example, the NDI may represent a one-bit indication of whether data in the retransmission of the PDSCH 410 is new data or a retransmission of data (e.g., based on any previous transmissions). If, as in this example, the previous transmission is missed or lost by the UE 115, the UE 115 may misinterpret an NDI that indicates that the retransmission is based on another previous transmission with a same HARQ process identifier and may therefore not provide correct feedback data. As such, the base station 105 may instead set the NDI value of the retransmission to be the same as in the previous transmission, which may indicate to the UE 115 that the retransmission is a first transmission that the UE 115 has received.

In some cases, the base station 105 may schedule the UE 115 to transmit the super-ACK feedback and the HARQ feedback in separate transmissions, or in separate PUCCHs 420. For example, the base station 105 may schedule the UE 115 to transmit the two types of feedback in different TTIs 415 (e.g., different slots or sub-slots). In some cases, the network may impose a limitation on a scheduler of the base station 105 to transmit the super-ACK feedback and the HARQ feedback separately (e.g., as specified by a wireless communications standard). In such cases, the UE 115 may not be expected to receive an uplink grant for the super-ACK feedback and an uplink grant for the HARQ feedback, where either or both of the respective uplink grants indicate to multiplex the two types of feedback (e.g., in one codebook). In some cases, the base station 105 may dynamically indicate (e.g., via a respective PDCCH 430) or semi-statically indicate (e.g., via an RRC configuration) whether the UE 115 may multiplex the super-ACK feedback and the HARQ feedback in a same transmission (e.g., in a same codebook) or whether the UE may transmit the two types of feedback using separate resources.

Figure 5:
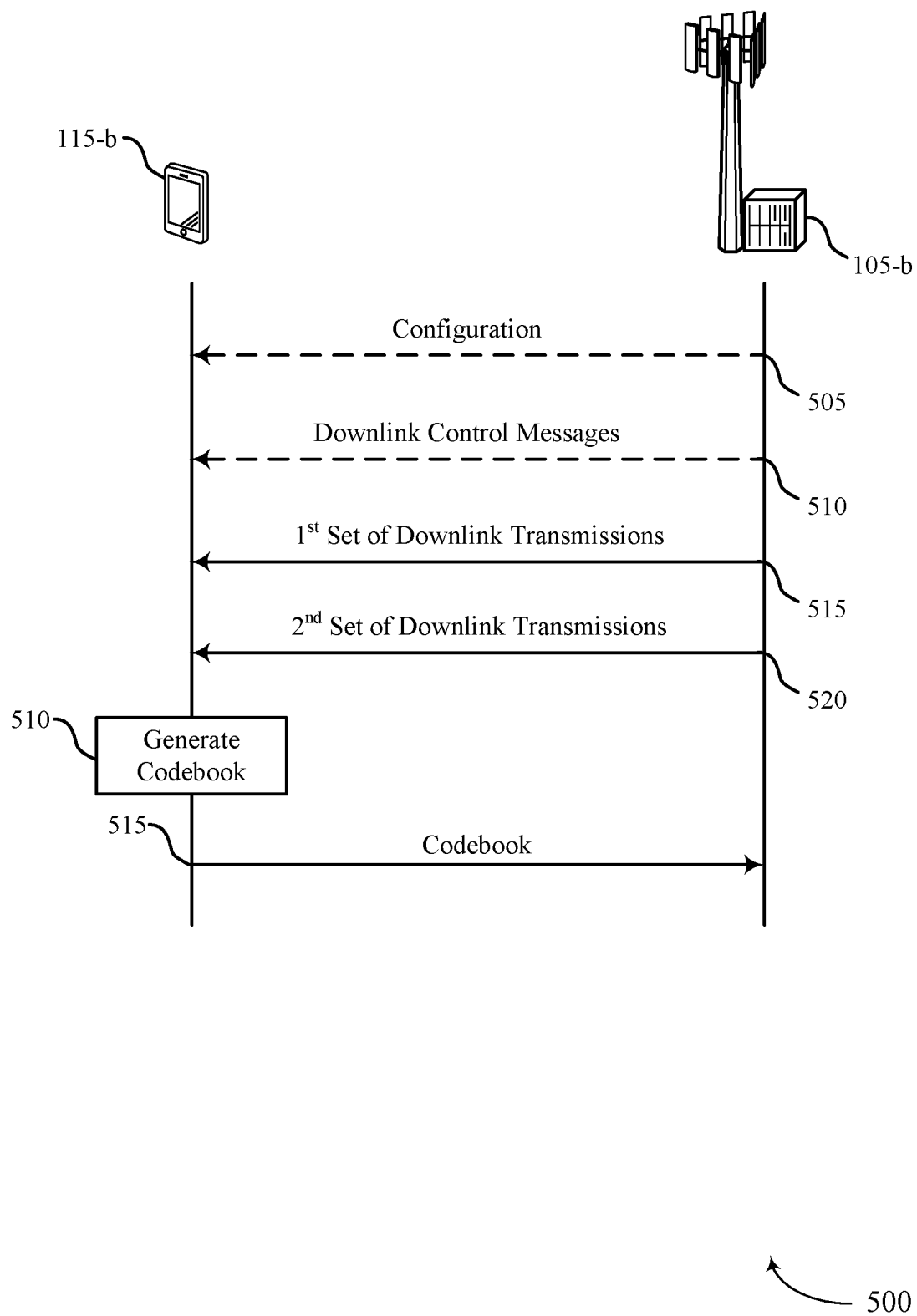
FIG. 5 illustrates an example of a process flow that supports codebook construction for enhanced HARQ feedback in accordance with aspects of the present disclosure.

FIG. 5 illustrates an example of a process flow 500 that supports codebook construction for enhanced HARQ feedback in accordance with aspects of the present disclosure. In some examples, process flow 500 may implement or be implemented by aspects of wireless communications systems 100 or 200. In some cases, process flow 500 may implement or be implemented by aspects of a codebook determination scheme 300 or 400. Process flow may be implemented by a base station 105-*b* and a UE 115-*b*. Base station 105-*b* and UE 115-*b-d* may represent examples of a base station 105 and UEs 115 described herein with reference to FIGS. 1-4. Base station 105-*b* may configure UE 115-*b* to report super-ACK feedback for one or more downlink transmissions and may transmit multiple downlink transmissions to UE 115-*b*.

In the following description of process flow 500, the operations between UE 115-*b* and base station 105-*b* may be transmitted in a different order than the order shown, or the operations performed by UE 115-*b* and base station 105-*b* may be performed in different orders or at different times. Specific operations may also be left out of process flow 500, or other operations may be added to process flow 500. Although UE 115-*b* and base station 105-*b* are shown performing the operations of process flow 500, some aspects of some operations may also be performed by one or more other wireless devices.

At 505, base station 105-*b* may configure UE 115-*b* to report super-ACK feedback and may further configure UE 115-*b* with one or more parameters (e.g., RRC parameters) for reporting the super-ACK feedback. For example, base station 105-*b* may transmit an RRC message to UE 115-*b* to configure UE 115-*b* for super-ACK reporting. In some cases, the RRC message may include a fixed size (e.g., number of bits or number of feedback occasions) associated with a semi-static configuration for a codebook for super-ACK feedback.

At 510, base station 105-*b* may transmit multiple DCI messages (e.g., DCI or PDCCH occasions) to UE 115-*b* to schedule multiple downlink transmissions (e.g., downlink transmissions or PDSCH occasions). Each DCI message may indicate whether a corresponding downlink transmission is associated with HARQ feedback or super-ACK feedback. In some cases, a DCI message may include a DAI field to indicate a size (e.g., a number of feedback occasions) associated with the corresponding downlink transmission. In some cases, a DAI field may additionally indicate total and counter values associated with the corresponding downlink transmission. In some cases, a DCI message (e.g., a PDCCH) may represent a downlink transmission, or a portion thereof.

At 515, base station 105-*b* may transmit a first set of one or more downlink transmissions associated with a first HARQ configuration, where the first HARQ configuration may correspond to a first type of feedback message including a first quantity of one or more bits. As described herein, the first set of one or more downlink transmissions may represent PDSCH transmissions, PDCCH transmissions, or any combination thereof. In some cases, the first HARQ configuration may be a configuration for HARQ feedback, and in some cases the first HARQ configuration may be a configuration for super-ACK feedback. As described herein, base station 105-*b* may indicate the first HARQ configuration via one or more DCI messages corresponding to the first set of one or more downlink transmissions.

At 520, base station 105-*b* may transmit a second set of one or more downlink transmissions associated with a second HARQ configuration, where the second HARQ configuration may correspond to a second type of feedback message including a second quantity of multiple bits. As described herein, the second set of one or more downlink transmissions may represent PDSCH transmissions, PDCCH transmissions, or any combination thereof. The second HARQ configuration may represent a configuration for super-ACK feedback. In some cases, the second quantity may be different than the first quantity, for example, if the first quantity represents one bit for HARQ feedback or if the first quantity represents a different number of bits for super-ACK feedback than the second quantity. In some cases, the second quantity and the first quantity may be the same (e.g., if the first quantity is associated with a same super-ACK feedback). As described herein, base station 105-*b* may indicate the second HARQ configuration via one or more DCI messages corresponding to the second set of one or more downlink transmissions.

At 525, UE 115-*b* may generate, in response to the first set of downlink transmissions and the second set of downlink transmissions, a HARQ codebook that includes one or more feedback messages of the first type and one or more feedback messages of the second type. Each feedback message may correspond to one feedback occasion (e.g., one downlink transmission). In some cases, the one or more feedback messages of the first type may correspond to HARQ feedback and the one or more feedback messages of the second type may correspond to super-ACK feedback, and UE 115-*b* may use one or more of the techniques described herein to multiplex the different types of feedback messages into the HARQ codebook. For example, UE 115-*b* may pad or insert dummy bits into a feedback message of the first type. Similarly, UE 115-*b* may generate a first sub-codebook for feedback messages of the first type and a second sub-codebook for feedback messages of the second type, and may concatenate or combine the two sub-codebooks.

In some cases, the one or more feedback messages of the first type may correspond to a first type of super-ACK feedback and the one or more feedback messages of the second type may correspond to a second type of super-ACK feedback. In such cases, UE 115-*b* may use one or more of the methods described herein to multiplex the different types of feedback messages into the HARQ codebook. For example, UE 115-*b* may pad or insert dummy bits into a feedback message of the first type if the first type of feedback message includes less bits than a feedback message of the second type. Similarly, UE 115-*b* may generate a first sub-codebook for feedback messages of the first type and a second sub-codebook for feedback messages of the second type, and may concatenate or combine the two sub-codebooks.

At 530, UE 115-*b* may transmit the HARQ codebook to base station 105-*b*. For example, UE 115-*b* may transmit a multiplexed HARQ codebook to base station 105-*b* over a PUCCH or over a PUSCH, as described herein. Base station 105-*b* may decode the transmitted HARQ codebook and may use the information included therein to determine whether to retransmit any of the first set or second set of one or more downlink transmissions to UE 115-*b*, as described herein. Base station 105-*b* may also use information (e.g., super-ACK feedback) included in the HARQ codebook to determine whether to alter one or more parameters for any retransmissions, as described herein.

Figure 6:
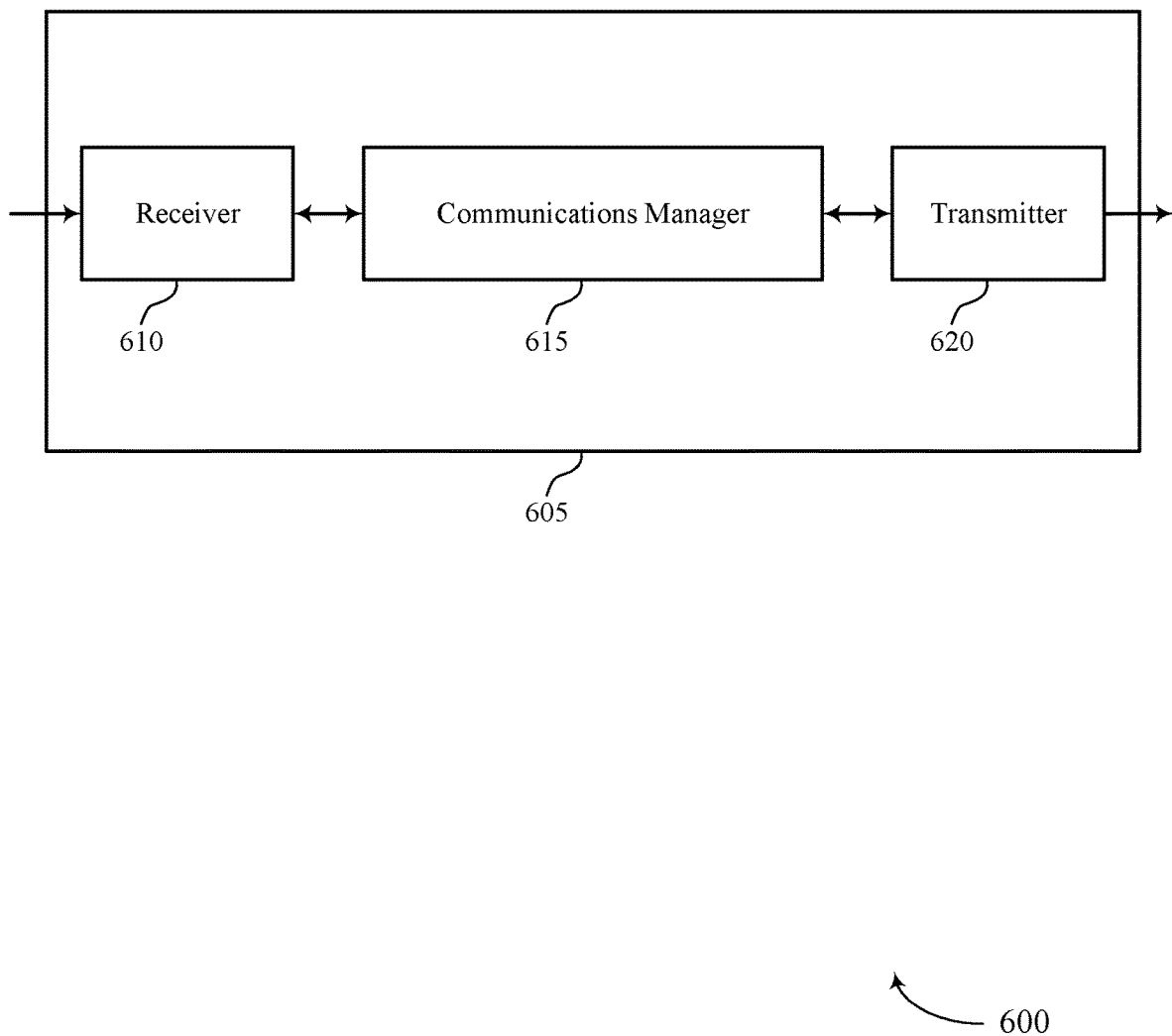
FIGS. 6 and 7 show block diagrams of devices that support codebook construction for enhanced HARQ feedback in accordance with aspects of the present disclosure.

FIG. 6 shows a block diagram 600 of a device 605 that supports codebook construction for enhanced hybrid automatic repeat request feedback in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to codebook construction for enhanced hybrid automatic repeat request feedback, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first set of one or more downlink transmissions associated with a first hybrid automatic repeat request configuration, where the first hybrid automatic repeat request configuration corresponds to a first type of feedback message associated with a first quantity of one or more bits, receive a second set of one or more downlink transmissions associated with a second hybrid automatic repeat request configuration, where the second hybrid automatic repeat request configuration corresponds to a second type of feedback message associated with a second quantity of multiple bits, and transmit, to a base station and in response to the first set of downlink transmissions and the second set of downlink transmissions, a hybrid automatic repeat request codebook that includes one or more feedback messages of the first type and one or more feedback messages of the second type. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615, among other examples herein, as described herein may be implemented to realize one or more potential advantages. For example, communications manager 615 may decrease communication overhead, decrease communication latency, and increase available power at a wireless device (e.g., a UE 115) by supporting construction of a combined codebook for a first HARQ feedback configuration and a second HARQ feedback configuration. The combined codebook may reduce overhead, reduce resources used for HARQ feedback, or reduce power consumption (or any combination thereof) compared to other systems and techniques, for example, that do not support construction of a codebook for a second HARQ feedback configuration. Accordingly, communications manager 615 may save power and increase battery life at a wireless device (e.g., a UE 115) by strategically reducing a number of retransmissions received by a wireless device (e.g., a UE 115).

Figure 7:
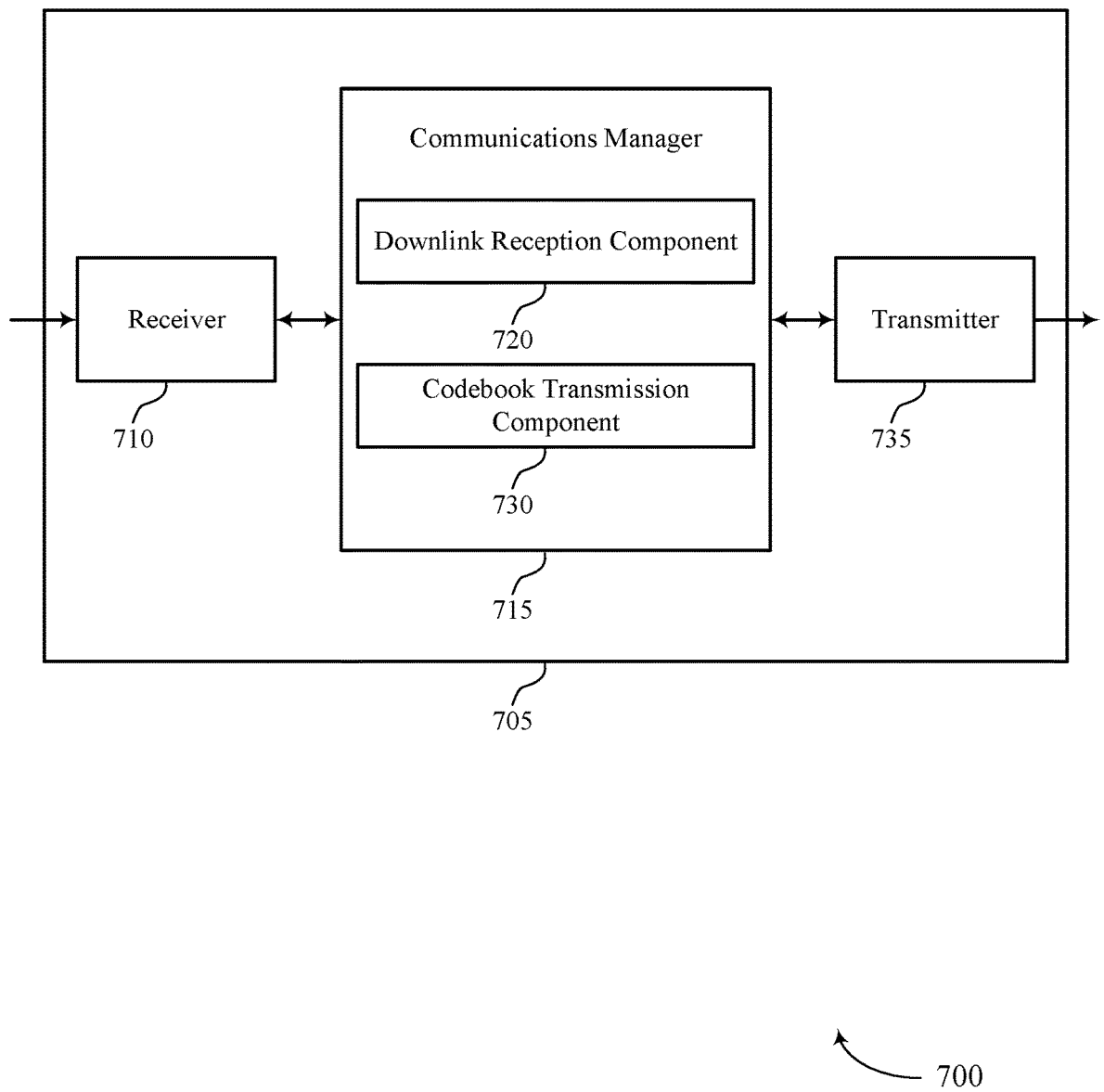

FIG. 7 shows a block diagram 700 of a device 705 that supports codebook construction for enhanced HARQ feedback in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to codebook construction for enhanced HARQ feedback, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a downlink reception component 720, and a codebook transmission component 730.

The communications manager 715 may be an example of aspects of the communications manager 910 described herein.

The downlink reception component 720 may receive a first set of one or more downlink transmissions associated with a first HARQ configuration, where the first HARQ configuration corresponds to a first type of feedback message associated with a first quantity of one or more bits and receive a second set of one or more downlink transmissions associated with a second HARQ configuration, where the second HARQ configuration corresponds to a second type of feedback message associated with a second quantity of multiple bits.

The codebook transmission component 730 may transmit, in response to the first set of downlink transmissions and the second set of downlink transmissions, a HARQ codebook that includes one or more feedback messages of the first type and one or more feedback messages of the second type.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a wireless device (e.g., controlling the receiver 710, the transmitter 735, or the transceiver 920 as described with reference to FIG. 9) may increase communication reliability and accuracy by decreasing communication overhead and latency, and increasing available power. The reduced overhead may reduce resource use and power consumption (e.g., via implementation of system components described with reference to FIG. 8) compared to other systems and techniques, for example, that do not support construction of a codebook for a second HARQ feedback configuration, which may increase processing or signaling overhead and power consumption. Further, the processor of the UE 115 may identify one or more aspects of a HARQ feedback configuration or codebook construction scheme to perform the processes described herein. The processor of the wireless device may use the HARQ feedback configuration or codebook construction scheme to perform one or more actions that may result in lower overhead use and power consumption, as well as save power and increase battery life at the wireless device (e.g., by strategically reducing an amount retransmissions), among other benefits.

Figure 8:
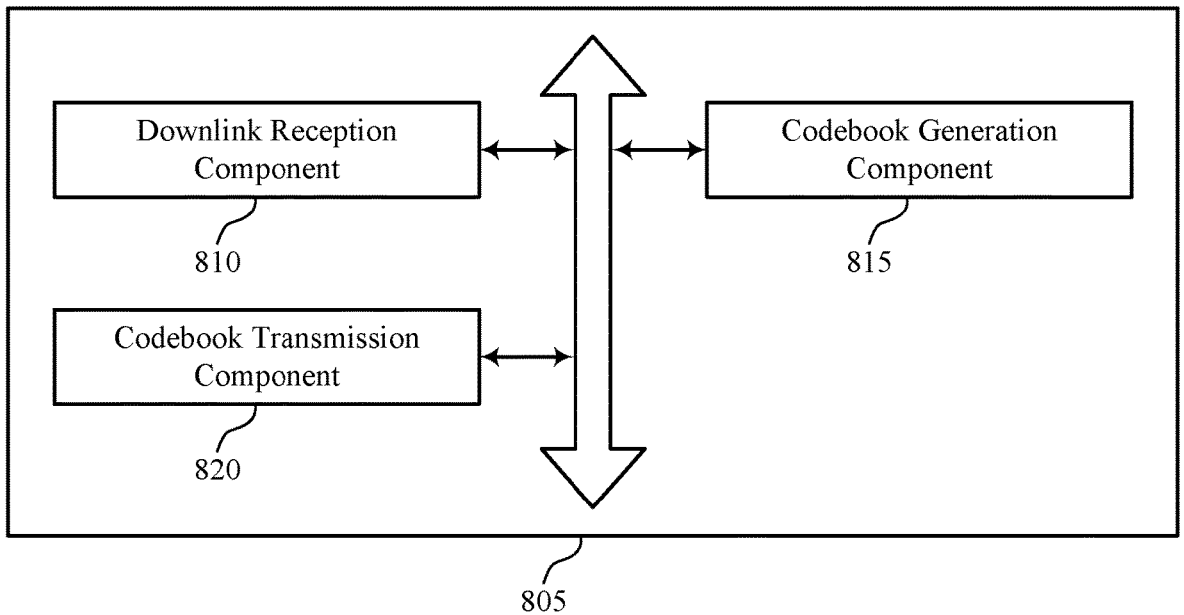
FIG. 8 shows a block diagram of a communications manager that supports codebook construction for enhanced HARQ feedback in accordance with aspects of the present disclosure.

FIG. 8 shows a block diagram 800 of a communications manager 805 that supports codebook construction for enhanced HARQ feedback in accordance with aspects of the present disclosure. The communications manager 805 may be an example of aspects of a communications manager 615, a communications manager 715, or a communications manager 910 described herein. The communications manager 805 may include a downlink reception component 810, a codebook generation component 815, and a codebook transmission component 820. Each of these modules may communicate, directly or indirectly, with one another (e.g., via one or more buses).

The downlink reception component 810 may receive a first set of one or more downlink transmissions associated with a first HARQ configuration, where the first HARQ configuration corresponds to a first type of feedback message associated with a first quantity of one or more bits. In some examples, receiving a second set of one or more downlink transmissions associated with a second HARQ configuration, where the second HARQ configuration corresponds to a second type of feedback message associated with a second quantity of multiple bits.

In some examples, the downlink reception component 810 may receive radio resource configuration information. In some examples, the downlink reception component 810 may receive a grant for an uplink transmission via an uplink shared channel, where the HARQ codebook is transmitted via the uplink shared channel based on an indicator included in the grant for the uplink transmission. In some examples, the downlink reception component 810 may identify, based on corresponding DCI, each downlink transmission in one of the first set of downlink transmissions or the second set of downlink transmissions as associated with one of the first HARQ configuration or the second HARQ configuration.

In some examples, the downlink reception component 810 may receive, for each downlink transmission in one of the first set of downlink transmissions or the second set of downlink transmissions, a respective DAI. In some examples, the downlink reception component 810 may receive DCI. In some examples, the downlink reception component 810 may receive a grant for an uplink transmission via an uplink shared channel, where the grant for the uplink transmission includes a first indicator that indicates a size of the first sub-codebook and a second indicator that indicates a size of the second sub-codebook.

In some examples, the downlink reception component 810 may receive, via DCI or RRC information, an indication of whether the one or more feedback messages of the first type and one or more feedback messages of the second type may be included in a same HARQ codebook, where generating the HARQ codebook is based on the indication. In some examples, the downlink reception component 810 may receive a third set of one or more downlink transmissions associated with a third HARQ configuration, where the third HARQ configuration corresponds to a third type of feedback message.

In some examples, the downlink reception component 810 may receive scheduling information from the base station. In some cases, the first set of downlink transmissions and the second set of downlink transmissions are received via a same downlink serving cell that supports the first HARQ configuration and the second HARQ configuration, where generating the respective sets of one or more filler bits is based on the first set of downlink transmissions and the second set of downlink transmissions being received via the same downlink serving cell that supports the first HARQ configuration and the second HARQ configuration.

In some cases, the first set of downlink transmissions is received over a first carrier associated with the first HARQ configuration. In some cases, the second set of downlink transmissions is received over a second carrier associated with the second HARQ configuration.

The codebook generation component 815 may generate, in response to the first set of downlink transmissions and the second set of downlink transmissions, a HARQ codebook that includes one or more feedback messages of the first type and one or more feedback messages of the second type. In some examples, the codebook generation component 815 may identify that the HARQ codebook is a first type of codebook. In one example, the first type of codebook may be a semi-static codebook. In some examples, generating, for each downlink transmission in the first set of downlink transmissions, a respective set of one or more filler bits, where the respective set of filler bits includes a third quantity of one or more filler bits that is equal to a difference between the second quantity and first quantity, the second quantity greater than the first quantity.

In some examples, the codebook generation component 815 may include each generated set of one or more filler bits in the HARQ codebook. In some examples, the codebook generation component 815 may identify a fixed size of the HARQ codebook based on the radio resource configuration information. In some examples, the codebook generation component 815 may generate for each downlink transmission in the first set of downlink transmissions, a respective set of identical feedback messages of the first type, where each feedback message of the first type in the respective set includes the first quantity of one or more bits, and where the respective set of identical feedback messages collectively includes the second quantity of bits and is included in the HARQ codebook.

In some examples, the codebook generation component 815 may identify a failure to decode a grant for a downlink transmission occasion. In some examples, the codebook generation component 815 may generate for the downlink transmission occasion, a respective discontinuous communication message that includes the second quantity of bits regardless of whether the downlink transmission occasion is associated with the first HARQ configuration or the second HARQ configuration. In some examples, the codebook generation component 815 may include the respective discontinuous communication message in the HARQ codebook.

In some examples, the codebook generation component 815 may identify that the HARQ codebook is a second type of codebook. In one example, the second type of codebook may be a dynamic codebook. In some examples, the codebook generation component 815 may generate a first sub-codebook for each downlink transmission in the first set of downlink transmissions, the first sub-codebook including a respective feedback message of the first type for each downlink transmission in the first set of downlink transmissions.

In some examples, the codebook generation component 815 may generate a second sub-codebook for each downlink transmission in the second set of downlink transmissions, the second sub-codebook including a respective feedback message of the second type for each downlink transmission in the second set of downlink transmissions. In some examples, the codebook generation component 815 may concatenate the first-sub-codebook and the second sub-codebook, where generating the HARQ codebook is based on the concatenating. In some examples, the codebook generation component 815 may increment DAIs associated with the second set of downlink transmissions independent of DAIs associated with the first set of downlink transmissions. In some examples, the codebook generation component 815 may identify a size of the first sub-codebook and a size of the second sub-codebook based on the DCI.

In some examples, the codebook generation component 815 may determine a size of the HARQ codebook as equal to the sum of the size of the first sub-codebook and the size of the second sub-codebook. In some examples, the codebook generation component 815 may identify (e.g., determine) a size for the HARQ codebook based on the first indicator and the second indicator, where the HARQ codebook is transmitted via the uplink shared channel based on the grant for the uplink transmission.

In some examples, the codebook generation component 815 may generate, for each downlink transmission in the first set of downlink transmissions, a respective set of first feedback bits, where the respective set of first feedback bits includes the first quantity of one or more bits and is included in the one or more feedback messages of the first type. In some examples, the codebook generation component 815 may generate, for each downlink transmission in the second set of downlink transmissions, a respective set of second feedback bits, where the respective set of second feedback bits includes the second quantity of one or more bits and is included in the one or more feedback messages of the second type. In some examples, the codebook generation component 815 may generate in response to the third set of downlink transmissions and the scheduling information, a second HARQ codebook that includes one or more feedback messages of the third type. In some cases, a feedback message of the first type includes ACK information. In some cases, a feedback message of the second type includes ACK information and CQI.

The codebook transmission component 820 may transmit, to a base station and in response to the first set of downlink transmissions and the second set of downlink transmissions, the HARQ codebook that includes one or more feedback messages of the first type and one or more feedback messages of the second type. In some examples, the codebook transmission component 820 may transmit the second HARQ codebook to the base station, where the second HARQ codebook is transmitted separately from the HARQ codebook. In some cases, the HARQ codebook is transmitted within a single transmission time interval. In some cases, the first type of feedback message and the second type of feedback message include a same type of feedback message that includes acknowledgement information and channel quality information.

Figure 9:
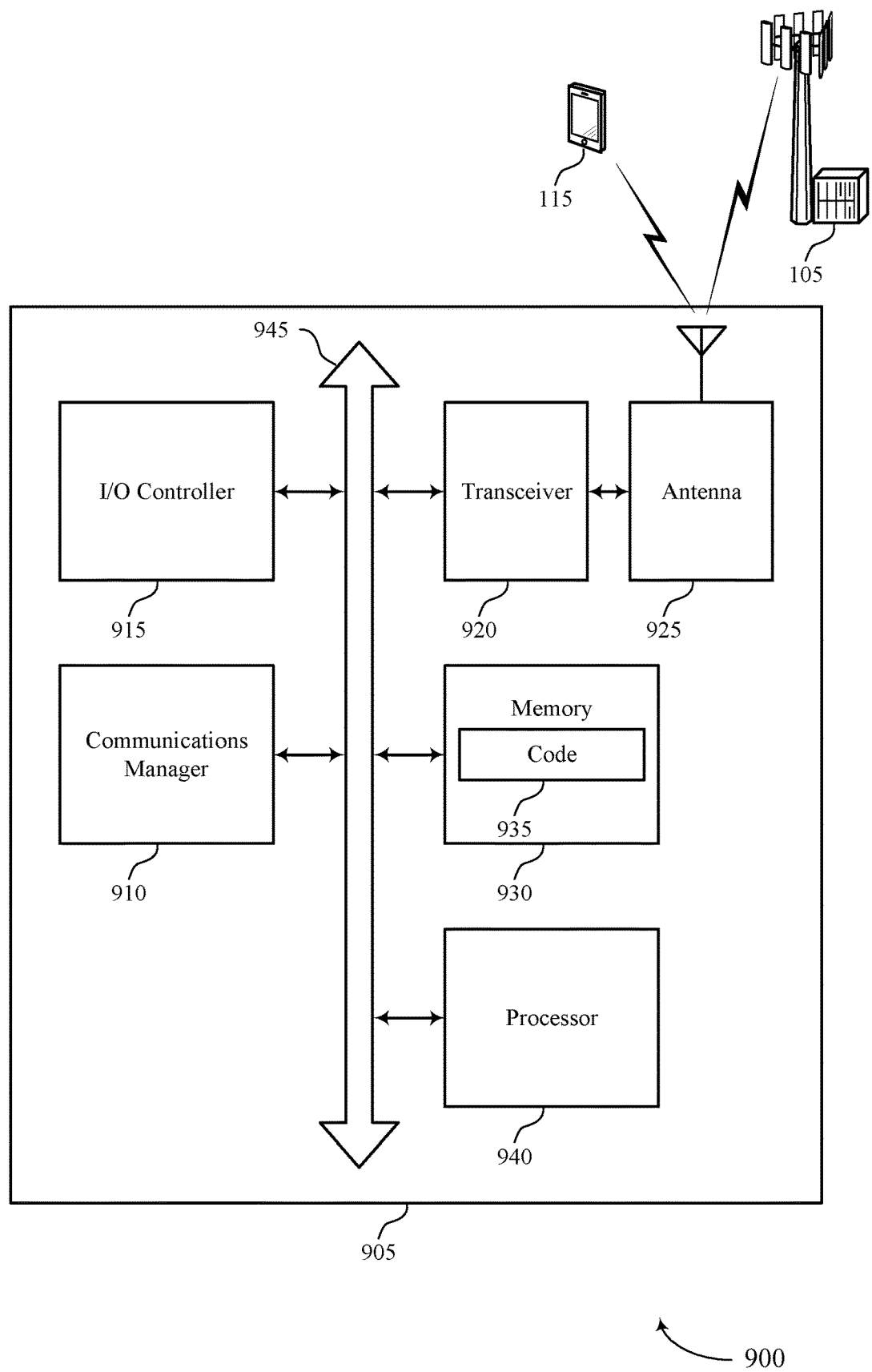
FIG. 9 shows a diagram of a system including a device that supports codebook construction for enhanced HARQ feedback in accordance with aspects of the present disclosure.

FIG. 9 shows a diagram of a system 900 including a device 905 that supports codebook construction for enhanced HARQ feedback in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first set of one or more downlink transmissions associated with a first HARQ configuration, where the first HARQ configuration corresponds to a first type of feedback message associated with a first quantity of one or more bits, receive a second set of one or more downlink transmissions associated with a second HARQ configuration, where the second HARQ configuration corresponds to a second type of feedback message associated with a second quantity of multiple bits, and transmit, to a base station and in response to the first set of downlink transmissions and the second set of downlink transmissions, a HARQ codebook that includes one or more feedback messages of the first type and one or more feedback messages of the second type, and transmit the HARQ codebook to a base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting codebook construction for enhanced HARQ feedback).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
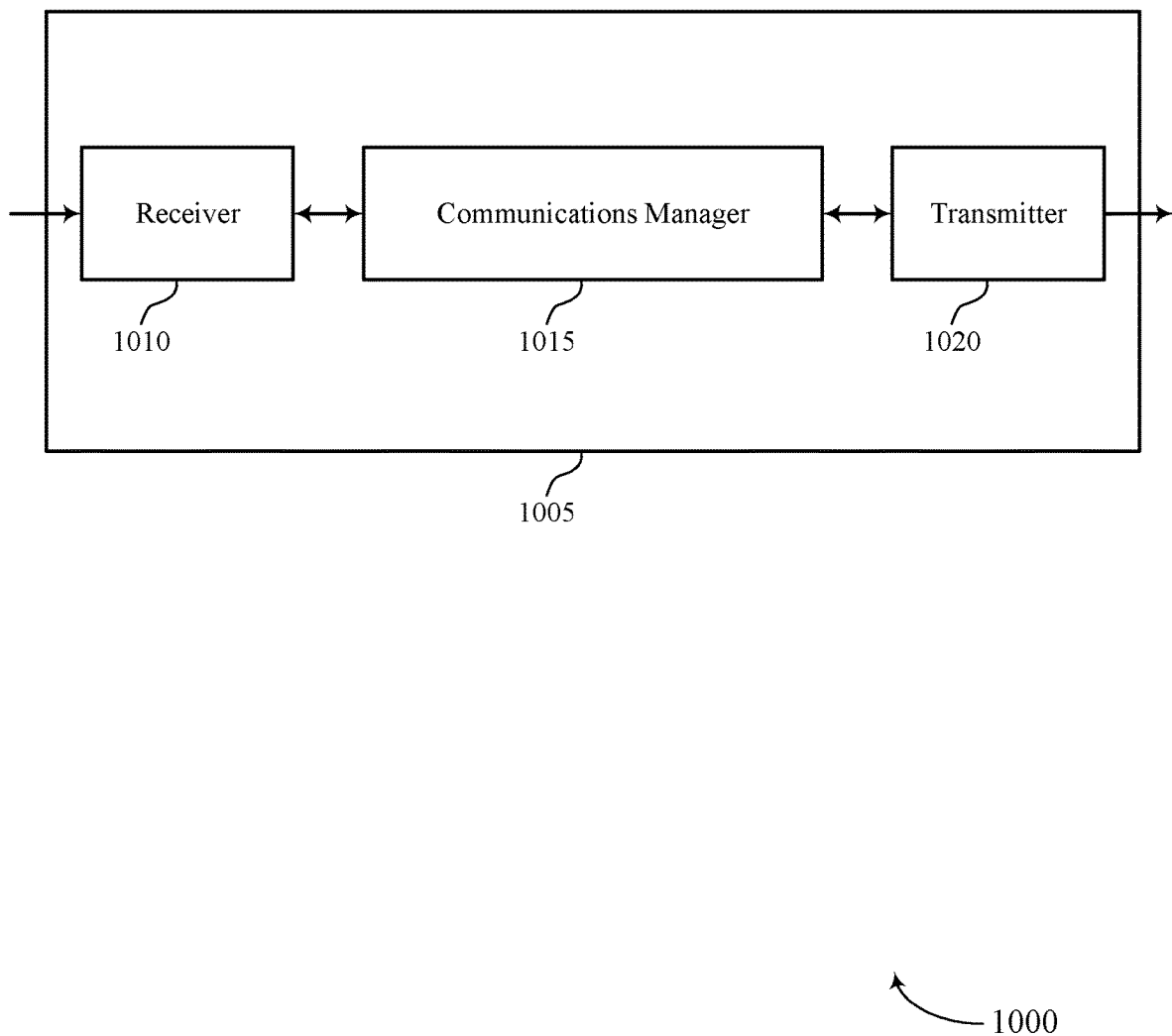
FIGS. 10 and 11 show block diagrams of devices that support codebook construction for enhanced HARQ feedback in accordance with aspects of the present disclosure.

FIG. 10 shows a block diagram 1000 of a device 1005 that supports codebook construction for enhanced HARQ feedback in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to codebook construction for enhanced HARQ feedback, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first set of one or more downlink transmissions associated with a first HARQ configuration, where the first HARQ configuration corresponds to a first type of feedback message associated with a first quantity of one or more bits, transmit a second set of one or more downlink transmissions associated with a second HARQ configuration, where the second HARQ configuration corresponds to a second type of feedback message associated with a second quantity of multiple bits, and receive, in response to the first set of downlink transmissions and the second set of downlink transmissions, a HARQ codebook that includes one or more feedback messages of the first type and one or more feedback messages of the second type. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
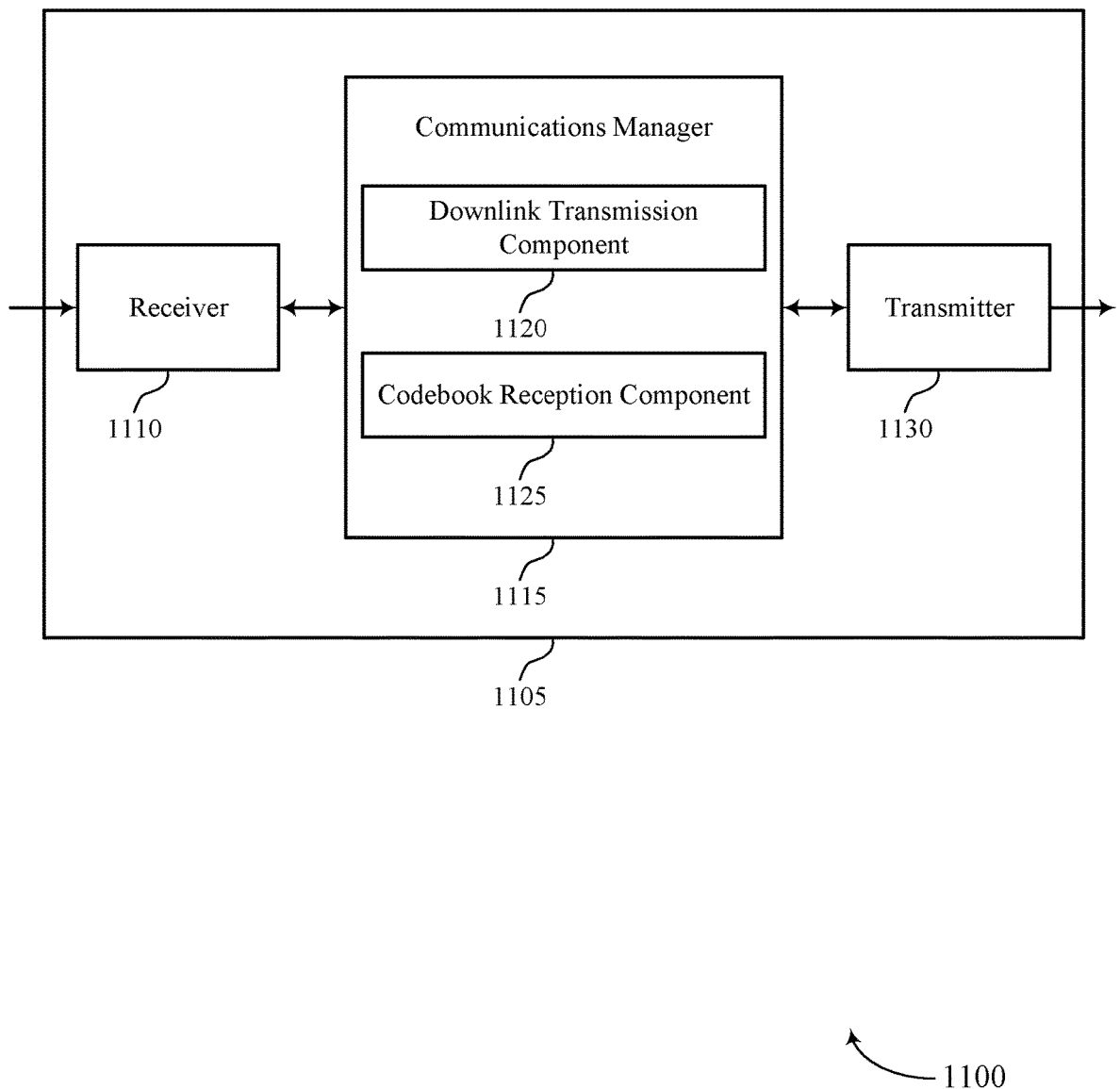

FIG. 11 shows a block diagram 1100 of a device 1105 that supports codebook construction for enhanced HARQ feedback in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to codebook construction for enhanced HARQ feedback, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a downlink transmission component 1120 and a codebook reception component 1125. The communications manager 1115 may be an example of aspects of the communications manager 1310 described herein.

The downlink transmission component 1120 may transmit a first set of one or more downlink transmissions associated with a first HARQ configuration, where the first HARQ configuration corresponds to a first type of feedback message associated with a first quantity of one or more bits and transmit a second set of one or more downlink transmissions associated with a second HARQ configuration, where the second HARQ configuration corresponds to a second type of feedback message associated with a second quantity of multiple bits.

The codebook reception component 1125 may receive, in response to the first set of downlink transmissions and the second set of downlink transmissions, a HARQ codebook that includes one or more feedback messages of the first type and one or more feedback messages of the second type.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
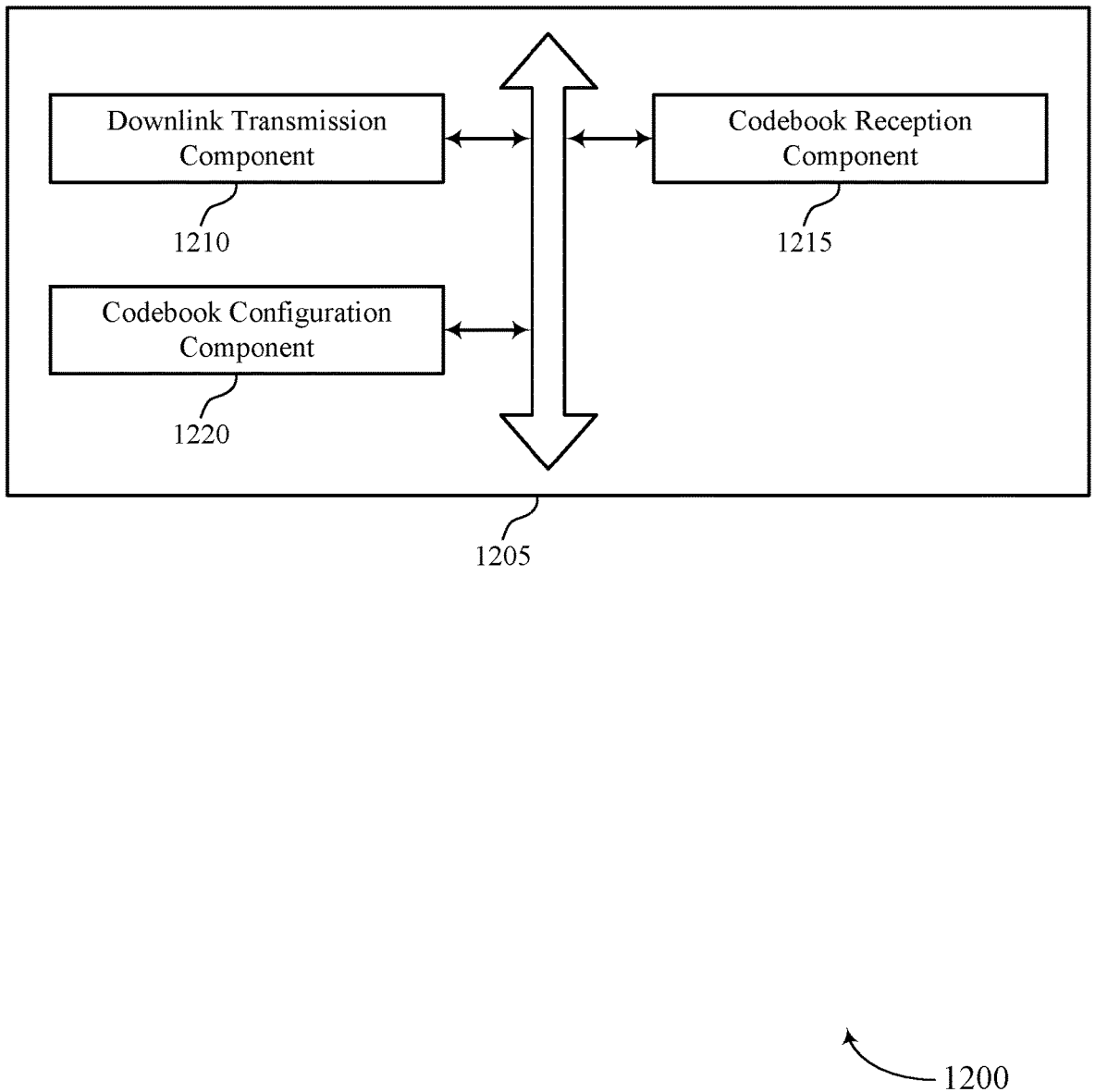
FIG. 12 shows a block diagram of a communications manager that supports codebook construction for enhanced HARQ feedback in accordance with aspects of the present disclosure.

FIG. 12 shows a block diagram 1200 of a communications manager 1205 that supports codebook construction for enhanced HARQ feedback in accordance with aspects of the present disclosure. The communications manager 1205 may be an example of aspects of a communications manager 1015, a communications manager 1115, or a communications manager 1310 described herein. The communications manager 1205 may include a downlink transmission component 1210, a codebook reception component 1215, and a codebook configuration component 1220. Each of these modules may communicate, directly or indirectly, with one another (e.g., via one or more buses).

The downlink transmission component 1210 may transmit a first set of one or more downlink transmissions associated with a first HARQ configuration, where the first HARQ configuration corresponds to a first type of feedback message associated with a first quantity of one or more bits. In some examples, the downlink transmission component 1210 may transmit a second set of one or more downlink transmissions associated with a second HARQ configuration, where the second HARQ configuration corresponds to a second type of feedback message associated with a second quantity of multiple bits.

In some examples, the downlink transmission component 1210 may transmit radio resource configuration information that indicates a fixed size of the HARQ codebook. In some examples, the downlink transmission component 1210 may transmit a grant for a downlink transmission occasion. In some examples, the downlink transmission component 1210 may transmit a grant for a user equipment to transmit an uplink transmission via an uplink shared channel, where the grant includes an indicator for the user equipment to transmit the HARQ codebook via the uplink shared channel. In some examples, the downlink transmission component 1210 may transmit DCI that indicates one of the first HARQ configuration or the second HARQ configuration for each downlink transmission in one of the first set of downlink transmissions or the second set of downlink transmissions.

In some examples, the downlink transmission component 1210 may transmit, for each downlink transmission in one of the first set of downlink transmissions or the second set of downlink transmissions, a respective DAI, where DAIs associated with the second set of downlink transmissions are incremented independent of DAIs associated with the first set of downlink transmissions. In some examples, the downlink transmission component 1210 may transmit DCI that indicates a size of the first sub-codebook and a size of the second sub-codebook.

In some examples, the downlink transmission component 1210 may transmit a grant for a user equipment to transmit an uplink transmission via an uplink shared channel, where the grant includes a first indicator that indicates a size of the first sub-codebook and a second indicator that indicates a size of the second sub-codebook, where the HARQ codebook is received via the uplink shared channel based on the grant for the uplink transmission. In some examples, the downlink transmission component 1210 may transmit, via DCI or RRC information, an indication of whether a user equipment may include the one or more feedback messages of the first type and one or more feedback messages of the second type in a same HARQ codebook. In some examples, the downlink transmission component 1210 may transmit a third set of one or more downlink transmissions associated with a third HARQ configuration, where the third HARQ configuration corresponds to a third type of feedback message.

In some examples, the downlink transmission component 1210 may transmit scheduling information to the UE. In some cases, the first set of downlink transmissions is transmitted over a first carrier associated with the first HARQ configuration. In some cases, the second set of downlink transmissions is transmitted over a second carrier associated with the second HARQ configuration.

The codebook reception component 1215 may receive, in response to the first set of downlink transmissions and the second set of downlink transmissions, a HARQ codebook that includes one or more feedback messages of the first type and one or more feedback messages of the second type. In some examples, the codebook reception component 1215 may decode the one or more feedback messages of the first type based on determining that the one or more feedback messages of the first type each include a respective set of one or more filler bits.

In some examples, the codebook reception component 1215 may decode the one or more feedback messages of the first type based on determining that the one or more feedback messages of the first type each include a respective set of identical feedback messages of the first type. In some examples, the codebook reception component 1215 may receive, in the HARQ codebook, a discontinuous communication message associated with the downlink transmission occasion, where the discontinuous communication message includes the second quantity of bits regardless of whether the downlink transmission occasion is associated with the first HARQ configuration or the second HARQ configuration.

In some examples, the codebook reception component 1215 may receive, as part of the HARQ codebook, a first sub-codebook for each downlink transmission in the first set of downlink transmissions, the first sub-codebook including a respective feedback message of the first type for each downlink transmission in the first set of downlink transmissions. In some examples, the codebook reception component 1215 may receive, as part of the HARQ codebook, a second sub-codebook for each downlink transmission in the second set of downlink transmissions, the second sub-codebook including a respective feedback message of the second type for each downlink transmission in the second set of downlink transmissions, where the first-sub-codebook and the second sub-codebook are concatenated.

In some examples, the codebook reception component 1215 may receive, in the one or more feedback messages of the first type and for each downlink transmission in the first set of downlink transmissions, a respective set of first feedback bits that includes the first quantity of one or more bits and is included in the one or more feedback messages of the first type. In some examples, the codebook reception component 1215 may receive, in the one or more feedback messages of the first type and for each downlink transmission in the second set of downlink transmissions, a respective set of second feedback bits that includes the second quantity of one or more bits and is included in the one or more feedback messages of the second type.

In some examples, the codebook reception component 1215 may receive, in response to the third set of downlink transmissions and the scheduling information, a second HARQ codebook that includes one or more feedback messages of the third type, where the second HARQ codebook is transmitted separately from the HARQ codebook. In some cases, a feedback message of the first type includes ACK information. In some cases, a feedback message of the second type includes ACK information and CQI. In some cases, the HARQ codebook is received within a single transmission time interval.

The codebook configuration component 1220 may configure the HARQ codebook to be a first type of codebook. In one example, the first type of codebook is a semi-static codebook. In some examples, the codebook configuration component 1220 may determine that the one or more feedback messages of the first type each include a respective set of one or more filler bits based on configuring the HARQ codebook to be the first type of codebook, where the respective set of filler bits includes a third quantity of one or more filler bits that is equal to a difference between the second quantity and first quantity, the second quantity greater than the first quantity.

In some examples, the codebook configuration component 1220 may determine that the one or more feedback messages of the first type each include a respective set of identical feedback messages of the first type based on configuring the HARQ codebook to be the first type of codebook, where each feedback message of the first type in the respective set includes the first quantity of one or more bits, and where the respective set of identical feedback messages collectively includes the second quantity of bits and is included in the HARQ codebook. In some examples, the codebook configuration component 1220 may configure the HARQ codebook to be a first type of codebook. In some examples, the codebook configuration component 1220 may configure the HARQ codebook to be a second type of codebook. In one example, the second type of codebook may be a dynamic codebook. In some cases, the first type of feedback message and the second type of feedback message include a same type of feedback message that includes acknowledgement information and channel quality information.

Figure 13:
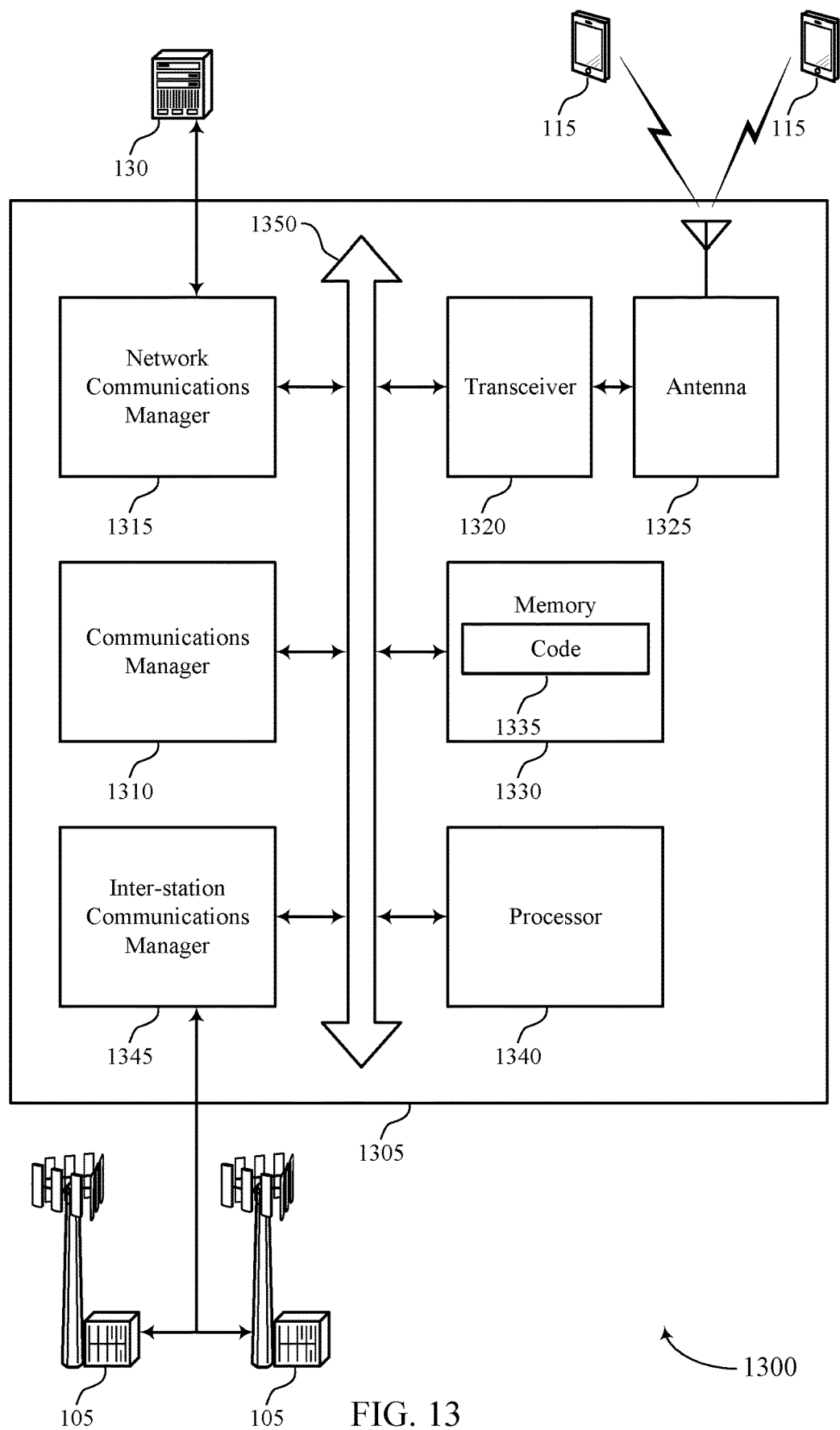
FIG. 13 shows a diagram of a system including a device that supports codebook construction for enhanced HARQ feedback in accordance with aspects of the present disclosure.

FIG. 13 shows a diagram of a system 1300 including a device 1305 that supports codebook construction for enhanced HARQ feedback in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a first set of one or more downlink transmissions associated with a first HARQ configuration, where the first HARQ configuration corresponds to a first type of feedback message associated with a first quantity of one or more bits, transmit a second set of one or more downlink transmissions associated with a second HARQ configuration, where the second HARQ configuration corresponds to a second type of feedback message associated with a second quantity of multiple bits, and receive, in response to the first set of downlink transmissions and the second set of downlink transmissions, a HARQ codebook that includes one or more feedback messages of the first type and one or more feedback messages of the second type.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting codebook construction for enhanced HARQ feedback).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
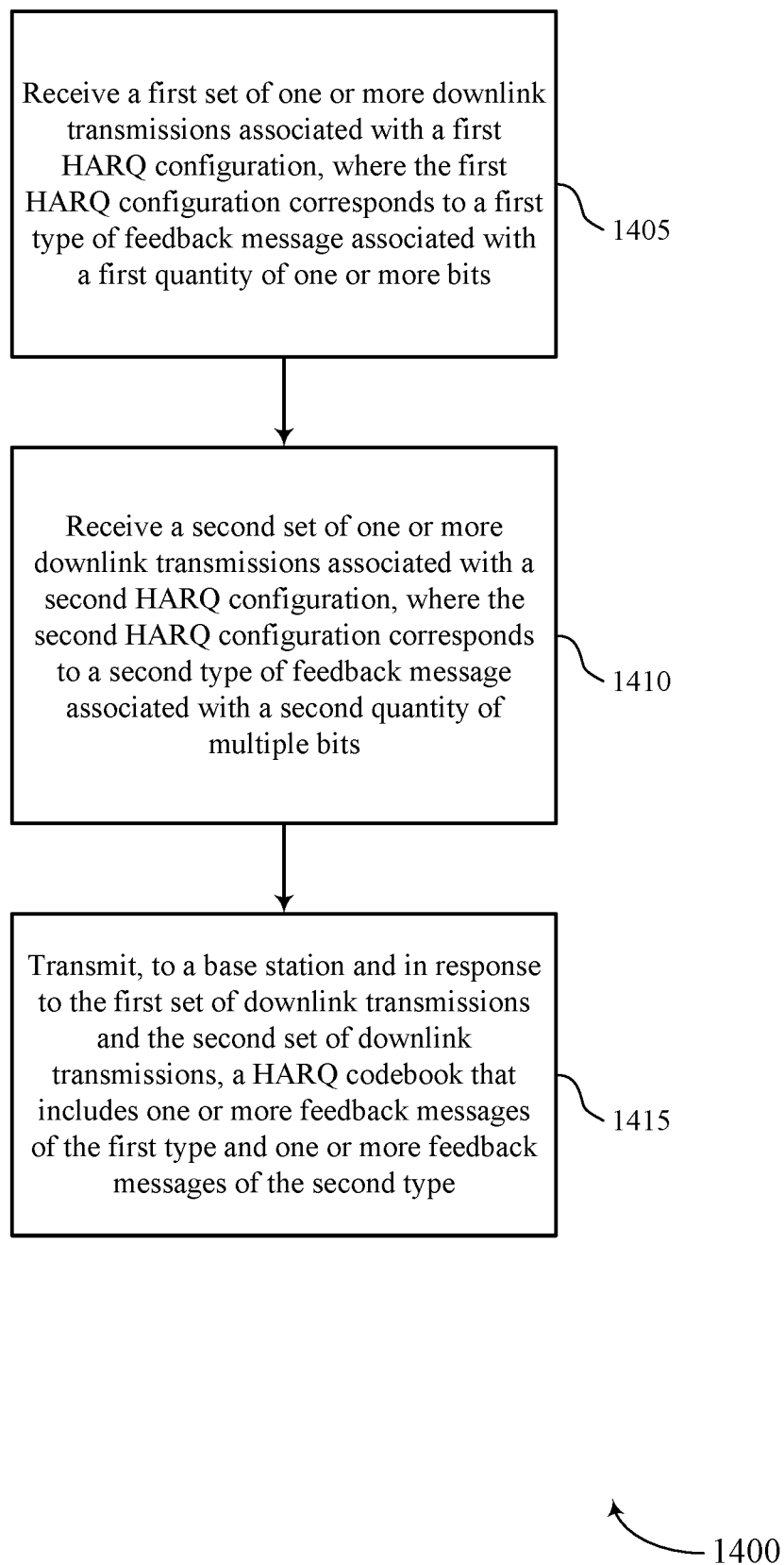
FIGS. 14 through 17 show flowcharts illustrating methods that support codebook construction for enhanced HARQ feedback in accordance with aspects of the present disclosure.

FIG. 14 shows a flowchart illustrating a method 1400 that supports codebook construction for enhanced HARQ feedback in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first set of one or more downlink transmissions associated with a first HARQ configuration, where the first HARQ configuration corresponds to a first type of feedback message associated with a first quantity of one or more bits. The operations of 1405 may be performed according to the methods described herein. In some examples, aspects of the operations of 1405 may be performed by a downlink reception component as described with reference to FIGS. 6 through 9. Additionally or alternatively, means for performing 1405 may, but not necessarily, include, for example, antenna 925, transceiver 920, communications manager 910, memory 930 (including code 935), processor 940 and/or bus 945.

At 1410, the UE may receive a second set of one or more downlink transmissions associated with a second HARQ configuration, where the second HARQ configuration corresponds to a second type of feedback message associated with a second quantity of multiple bits. The operations of 1410 may be performed according to the methods described herein. In some examples, aspects of the operations of 1410 may be performed by a downlink reception component as described with reference to FIGS. 6 through 9. Additionally or alternatively, means for performing 1410 may, but not necessarily, include, for example, antenna 925, transceiver 920, communications manager 910, memory 930 (including code 935), processor 940 and/or bus 945.

At 1415, the UE may transmit, to a base station and in response to the first set of downlink transmissions and the second set of downlink transmissions, a HARQ codebook that includes one or more feedback messages of the first type and one or more feedback messages of the second type. The operations of 1415 may be performed according to the methods described herein. In some examples, aspects of the operations of 1415 may be performed by a codebook transmission component as described 1415 reference to FIGS. 6 through 9. Additionally or alternatively, means for performing 1405 may, but not necessarily, include, for example, antenna 925, transceiver 920, communications manager 910, memory 930 (including code 935), processor 940 and/or bus 945.

Figure 15:
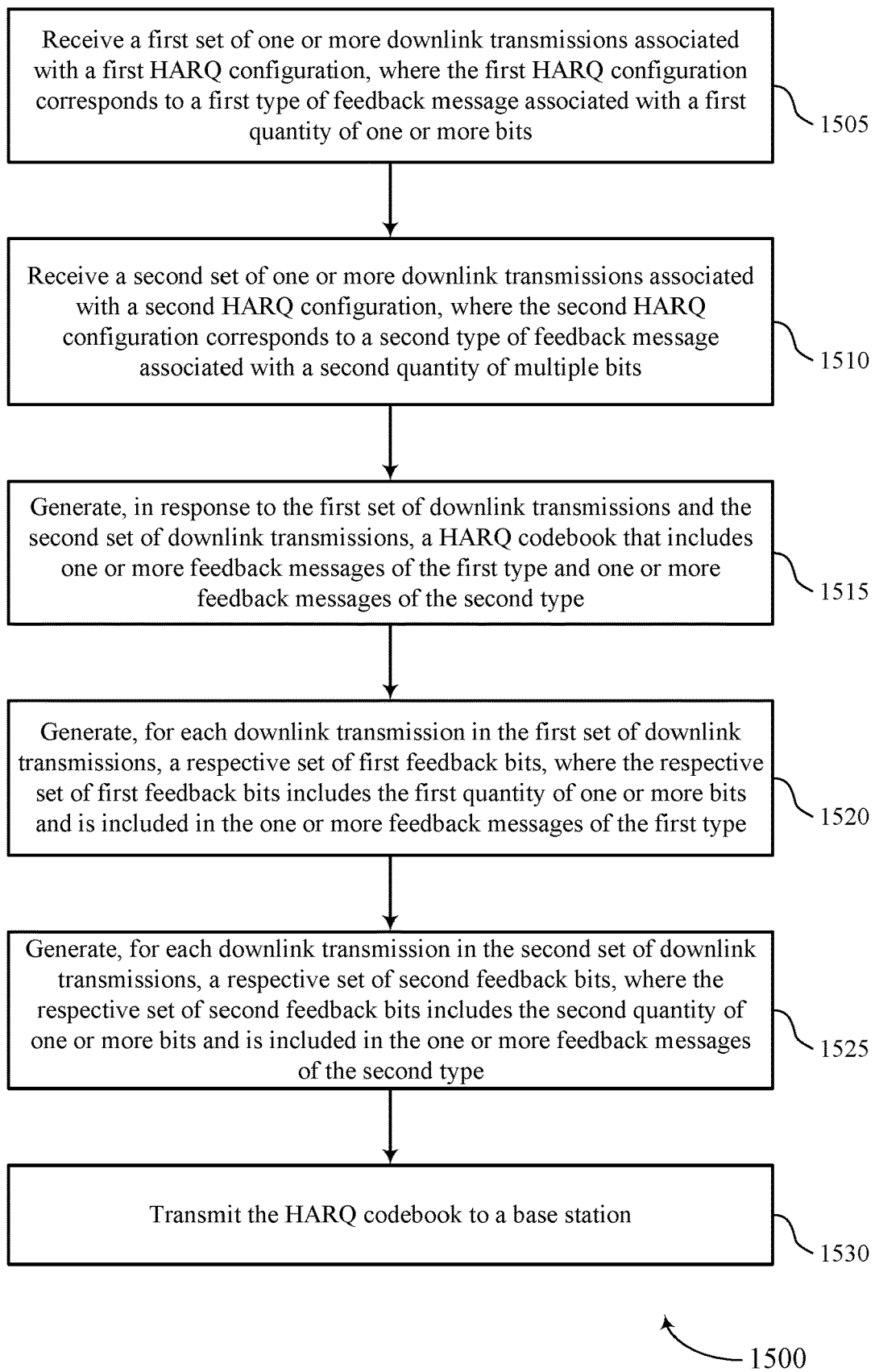

FIG. 15 shows a flowchart illustrating a method 1500 that supports codebook construction for enhanced HARQ feedback in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first set of one or more downlink transmissions associated with a first HARQ configuration, where the first HARQ configuration corresponds to a first type of feedback message associated with a first quantity of one or more bits. The operations of 1505 may be performed according to the methods described herein. In some examples, aspects of the operations of 1505 may be performed by a downlink reception component as described with reference to FIGS. 6 through 9. Additionally or alternatively, means for performing 1505 may, but not necessarily, include, for example, antenna 925, transceiver 920, communications manager 910, memory 930 (including code 935), processor 940 and/or bus 945.

At 1510, the UE may receive a second set of one or more downlink transmissions associated with a second HARQ configuration, where the second HARQ configuration corresponds to a second type of feedback message associated with a second quantity of multiple bits. The operations of 1510 may be performed according to the methods described herein. In some examples, aspects of the operations of 1510 may be performed by a downlink reception component as described with reference to FIGS. 6 through 9. Additionally or alternatively, means for performing 1510 may, but not necessarily, include, for example, antenna 925, transceiver 920, communications manager 910, memory 930 (including code 935), processor 940 and/or bus 945.

At 1515, the UE may generate, in response to the first set of downlink transmissions and the second set of downlink transmissions, a HARQ codebook that includes one or more feedback messages of the first type and one or more feedback messages of the second type. The operations of 1515 may be performed according to the methods described herein. In some examples, aspects of the operations of 1515 may be performed by a codebook generation component as described with reference to FIGS. 6 through 9. Additionally or alternatively, means for performing 1515 may, but not necessarily, include, for example, antenna 925, transceiver 920, communications manager 910, memory 930 (including code 935), processor 940 and/or bus 945.

At 1520, the UE may generate, for each downlink transmission in the first set of downlink transmissions, a respective set of first feedback bits, where the respective set of first feedback bits includes the first quantity of one or more bits and is included in the one or more feedback messages of the first type. The operations of 1520 may be performed according to the methods described herein. In some examples, aspects of the operations of 1520 may be performed by a codebook generation component as described with reference to FIGS. 6 through 9. Additionally or alternatively, means for performing 1520 may, but not necessarily, include, for example, antenna 925, transceiver 920, communications manager 910, memory 930 (including code 935), processor 940 and/or bus 945.

At 1525, the UE may generate, for each downlink transmission in the second set of downlink transmissions, a respective set of second feedback bits, where the respective set of second feedback bits includes the second quantity of one or more bits and is included in the one or more feedback messages of the second type. The operations of 1525 may be performed according to the methods described herein. In some examples, aspects of the operations of 1525 may be performed by a codebook generation component as described with reference to FIGS. 6 through 9. Additionally or alternatively, means for performing 1525 may, but not necessarily, include, for example, antenna 925, transceiver 920, communications manager 910, memory 930 (including code 935), processor 940 and/or bus 945.

At 1530, the UE may transmit the HARQ codebook to a base station. The operations of 1530 may be performed according to the methods described herein. In some examples, aspects of the operations of 1530 may be performed by a codebook transmission component as described with reference to FIGS. 6 through 9. Additionally or alternatively, means for performing 1530 may, but not necessarily, include, for example, antenna 925, transceiver 920, communications manager 910, memory 930 (including code 935), processor 940 and/or bus 945.

Figure 16:
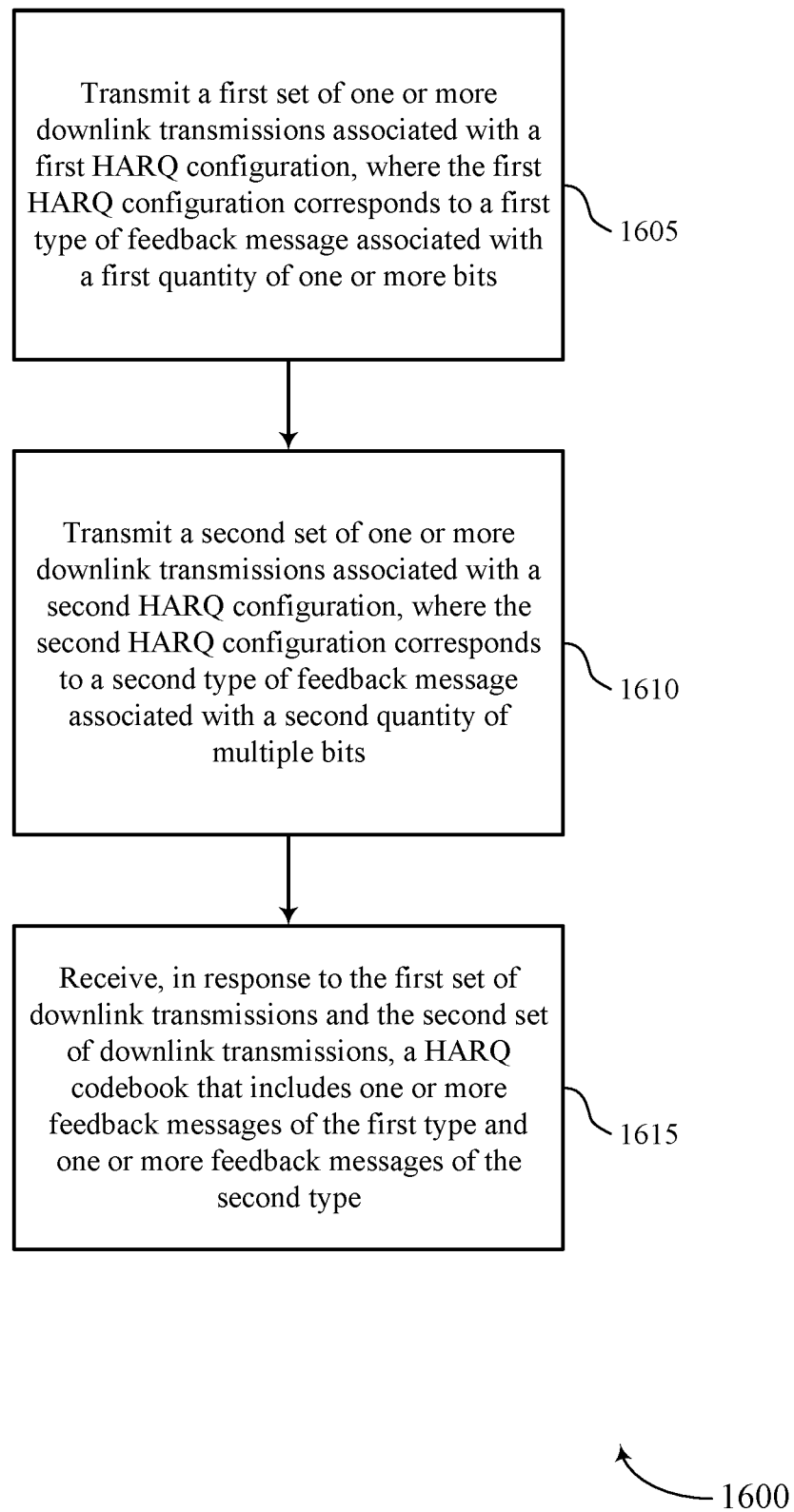

FIG. 16 shows a flowchart illustrating a method 1600 that supports codebook construction for enhanced HARQ feedback in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a first set of one or more downlink transmissions associated with a first HARQ configuration, where the first HARQ configuration corresponds to a first type of feedback message associated with a first quantity of one or more bits. The operations of 1605 may be performed according to the methods described herein. In some examples, aspects of the operations of 1605 may be performed by a downlink transmission component as described with reference to FIGS. 10 through 13. Additionally or alternatively, means for performing 1605 may, but not necessarily, include, for example, antenna 1325, transceiver 1320, communications manager 1310, memory 1330 (including code 1335), processor 1340 and/or bus 1350.

At 1610, the base station may transmit a second set of one or more downlink transmissions associated with a second HARQ configuration, where the second HARQ configuration corresponds to a second type of feedback message associated with a second quantity of multiple bits. The operations of 1610 may be performed according to the methods described herein. In some examples, aspects of the operations of 1610 may be performed by a downlink transmission component as described with reference to FIGS. 10 through 13. Additionally or alternatively, means for performing 1610 may, but not necessarily, include, for example, antenna 1325, transceiver 1320, communications manager 1310, memory 1330 (including code 1335), processor 1340 and/or bus 1350.

At 1615, the base station may receive, in response to the first set of downlink transmissions and the second set of downlink transmissions, a HARQ codebook that includes one or more feedback messages of the first type and one or more feedback messages of the second type. The operations of 1615 may be performed according to the methods described herein. In some examples, aspects of the operations of 1615 may be performed by a codebook reception component as described with reference to FIGS. 10 through 13. Additionally or alternatively, means for performing 1615 may, but not necessarily, include, for example, antenna 1325, transceiver 1320, communications manager 1310, memory 1330 (including code 1335), processor 1340 and/or bus 1350.

Figure 17:
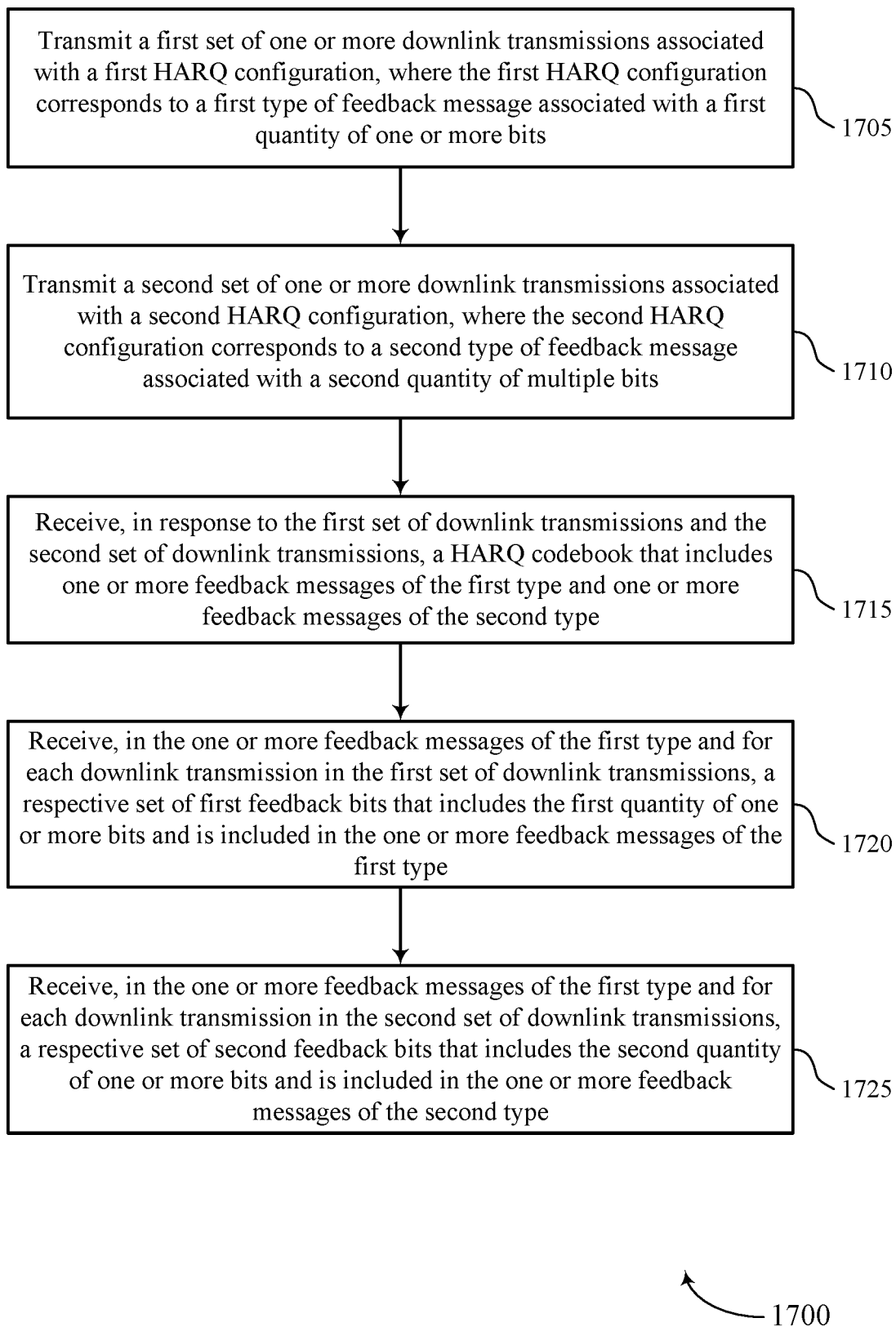

FIG. 17 shows a flowchart illustrating a method 1700 that supports codebook construction for enhanced HARQ feedback in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a first set of one or more downlink transmissions associated with a first HARQ configuration, where the first HARQ configuration corresponds to a first type of feedback message associated with a first quantity of one or more bits. The operations of 1705 may be performed according to the methods described herein. In some examples, aspects of the operations of 1705 may be performed by a downlink transmission component as described with reference to FIGS. 10 through 13. Additionally or alternatively, means for performing 1705 may, but not necessarily, include, for example, antenna 1325, transceiver 1320, communications manager 1310, memory 1330 (including code 1335), processor 1340 and/or bus 1350.

At 1710, the base station may transmit a second set of one or more downlink transmissions associated with a second HARQ configuration, where the second HARQ configuration corresponds to a second type of feedback message associated with a second quantity of multiple bits. The operations of 1710 may be performed according to the methods described herein. In some examples, aspects of the operations of 1710 may be performed by a downlink transmission component as described with reference to FIGS. 10 through 13. Additionally or alternatively, means for performing 1710 may, but not necessarily, include, for example, antenna 1325, transceiver 1320, communications manager 1310, memory 1330 (including code 1335), processor 1340 and/or bus 1350.

At 1715, the base station may receive, in response to the first set of downlink transmissions and the second set of downlink transmissions, a HARQ codebook that includes one or more feedback messages of the first type and one or more feedback messages of the second type. The operations of 1715 may be performed according to the methods described herein. In some examples, aspects of the operations of 1715 may be performed by a codebook reception component as described with reference to FIGS. 10 through 13. Additionally or alternatively, means for performing 1715 may, but not necessarily, include, for example, antenna 1325, transceiver 1320, communications manager 1310, memory 1330 (including code 1335), processor 1340 and/or bus 1350.

At 1720, the base station may receive, in the one or more feedback messages of the first type and for each downlink transmission in the first set of downlink transmissions, a respective set of first feedback bits that includes the first quantity of one or more bits and is included in the one or more feedback messages of the first type. The operations of 1720 may be performed according to the methods described herein. In some examples, aspects of the operations of 1720 may be performed by a codebook reception component as described with reference to FIGS. 10 through 13. Additionally or alternatively, means for performing 1720 may, but not necessarily, include, for example, antenna 1325, transceiver 1320, communications manager 1310, memory 1330 (including code 1335), processor 1340 and/or bus 1350.

At 1725, the base station may receive, in the one or more feedback messages of the first type and for each downlink transmission in the second set of downlink transmissions, a respective set of second feedback bits that includes the second quantity of one or more bits and is included in the one or more feedback messages of the second type. The operations of 1725 may be performed according to the methods described herein. In some examples, aspects of the operations of 1725 may be performed by a codebook reception component as described with reference to FIGS. 10 through 13. Additionally or alternatively, means for performing 1725 may, but not necessarily, include, for example, antenna 1325, transceiver 1320, communications manager 1310, memory 1330 (including code 1335), processor 1340 and/or bus 1350.

The following provides an overview of aspects of the present disclosure:

Aspect 1: A method for wireless communication at a UE, comprising: receiving a first set of one or more downlink transmissions associated with a first HARQ configuration, wherein the first HARQ configuration corresponds to a first type of feedback message associated with a first quantity of one or more bits; receiving a second set of one or more downlink transmissions associated with a second HARQ configuration, wherein the second HARQ configuration corresponds to a second type of feedback message associated with a second quantity of multiple bits; and transmitting, to a base station and in response to the first set of downlink transmissions and the second set of downlink transmissions, a HARQ codebook that comprises one or more feedback messages of the first type and one or more feedback messages of the second type.

Aspect 2: The method of aspect 1, wherein the HARQ codebook is a first type of codebook, the method further comprising: generating, for each downlink transmission in the first set of downlink transmissions, a respective set of one or more filler bits, wherein the respective set of filler bits comprises a third quantity of one or more filler bits that is equal to a difference between the second quantity and first quantity, the second quantity greater than the first quantity; and including each generated set of one or more filler bits in the HARQ codebook.

Aspect 3: The method of aspect 2, wherein the first set of downlink transmissions and the second set of downlink transmissions are received via a same downlink serving cell that supports the first HARQ configuration and the second HARQ configuration, the method further comprising: generating the respective sets of one or more filler bits is based at least in part on the first set of downlink transmissions and the second set of downlink transmissions being received via the same downlink serving cell that supports the first HARQ configuration and the second HARQ configuration.

Aspect 4: The method of any of aspects 2 through 3, further comprising: receiving radio resource configuration information identifying a fixed size of the HARQ codebook.

Aspect 5: The method of any of aspects 1 through 4, wherein the HARQ codebook is a first type of codebook, the method further comprising: generating, for each downlink transmission in the first set of downlink transmissions, a respective set of identical feedback messages of the first type, wherein each feedback message of the first type in the respective set comprises the first quantity of bits, and wherein the respective set of identical feedback messages collectively comprises the second quantity of bits and is included in the HARQ codebook.

Aspect 6: The method of any of aspects 1 through 5, wherein the HARQ codebook is a first type of codebook, the method further comprising: identifying a failure to decode a grant for a downlink transmission occasion; generating, for the downlink transmission occasion, a respective discontinuous communication message that comprises the second quantity of bits regardless of whether the downlink transmission occasion is associated with the first HARQ configuration or the second HARQ configuration; and including the respective discontinuous communication message in the HARQ codebook.

Aspect 7: The method of any of aspects 1 through 6, wherein the HARQ codebook is a first type of codebook, the method further comprising: receiving a grant for an uplink transmission via an uplink shared channel, wherein the HARQ codebook is transmitted via the uplink shared channel based at least in part on an indicator included in the grant for the uplink transmission.

Aspect 8: The method of aspect 1, wherein the HARQ codebook is a second type of codebook, the method further comprising: generating a first sub-codebook for each downlink transmission in the first set of downlink transmissions, the first sub-codebook comprising a respective feedback message of the first type for each downlink transmission in the first set of downlink transmissions; generating a second sub-codebook for each downlink transmission in the second set of downlink transmissions, the second sub-codebook comprising a respective feedback message of the second type for each downlink transmission in the second set of downlink transmissions; and concatenating the first-sub-codebook and the second sub-codebook, wherein generating the HARQ codebook is based at least in part on the concatenating.

Aspect 9: The method of aspect 8, further comprising: identifying, based at least in part on corresponding DCI, each downlink transmission in one of the first set of downlink transmissions or the second set of downlink transmissions as associated with one of the first HARQ configuration or the second HARQ configuration.

Aspect 10: The method of any of aspects 8 through 9, further comprising: receiving, for each downlink transmission in one of the first set of downlink transmissions or the second set of downlink transmissions, a respective DAI; and incrementing DAIs associated with the second set of downlink transmissions independent of DAIs associated with the first set of downlink transmissions.

Aspect 11: The method of any of aspects 8 through 10, further comprising: receiving DCI identifying a size of the first sub-codebook and a size of the second sub-codebook; and determining a size of the HARQ codebook as equal to a sum of the size of the first sub-codebook and the size of the second sub-codebook.

Aspect 12: The method of any of aspects 8 through 11, further comprising: receiving a grant for an uplink transmission via an uplink shared channel, wherein the grant for the uplink transmission includes a first indicator that indicates a size of the first sub-codebook and a second indicator that indicates a size of the second sub-codebook; and determining a size for the HARQ codebook based at least in part on the first indicator and the second indicator, wherein the HARQ codebook is transmitted via the uplink shared channel based at least in part on the grant for the uplink transmission.

Aspect 13: The method of any of aspects 1 through 12, further comprising: generating, for each downlink transmission in the first set of downlink transmissions, a respective set of first feedback bits, wherein the respective set of first feedback bits comprises the first quantity of bits and is included in the one or more feedback messages of the first type; and generating, for each downlink transmission in the second set of downlink transmissions, a respective set of second feedback bits, wherein the respective set of second feedback bits comprises the second quantity of bits and is included in the one or more feedback messages of the second type.

Aspect 14: The method of any of aspects 1 through 13, further comprising: receiving, via DCI or RRC information, an indication of whether the one or more feedback messages of the first type and one or more feedback messages of the second type may be included in a same HARQ codebook, wherein generating the HARQ codebook is based at least in part on the indication.

Aspect 15: The method of any of aspects 1 through 14, further comprising: receiving a third set of one or more downlink transmissions associated with a third HARQ configuration, wherein the third HARQ configuration corresponds to a third type of feedback message; receiving scheduling information from the base station; generating, in response to the third set of downlink transmissions and the scheduling information, a second HARQ codebook that comprises one or more feedback messages of the third type; and transmitting the second HARQ codebook to the base station, wherein the second HARQ codebook is transmitted separately from the HARQ codebook.

Aspect 16: The method of any of aspects 1 through 15, wherein the first set of downlink transmissions is received over a first carrier associated with the first HARQ configuration; and the second set of downlink transmissions is received over a second carrier associated with the second HARQ configuration.

Aspect 17: The method of any of aspects 1 through 16, wherein the first type of feedback message and the second type of feedback message comprise a same type of feedback message that comprises acknowledgement information and CQI.

Aspect 18: The method of any of aspects 1 through 16, wherein a feedback message of the first type comprises acknowledgement information; and a feedback message of the second type comprises acknowledgement information and CQI.

Aspect 19: The method of any of aspects 1 through 18, wherein the HARQ codebook is transmitted within a single transmission time interval.

Aspect 20: A method for wireless communication at a base station, comprising: transmitting a first set of one or more downlink transmissions associated with a first HARQ configuration, wherein the first HARQ configuration corresponds to a first type of feedback message associated with a first quantity of one or more bits; transmitting a second set of one or more downlink transmissions associated with a second HARQ configuration, wherein the second HARQ configuration corresponds to a second type of feedback message associated with a second quantity of multiple bits; and receiving, in response to the first set of downlink transmissions and the second set of downlink transmissions, a HARQ codebook that comprises one or more feedback messages of the first type and one or more feedback messages of the second type.

Aspect 21: The method of aspect 20, further comprising: configuring the HARQ codebook to be a first type of codebook; determining that the one or more feedback messages of the first type each include a respective set of one or more filler bits based at least in part on configuring the HARQ codebook to be the first type of codebook, wherein the respective set of filler bits comprises a third quantity of one or more filler bits that is equal to a difference between the second quantity and first quantity, the second quantity greater than the first quantity; and decoding the one or more feedback messages of the first type based at least in part on determining that the one or more feedback messages of the first type each include a respective set of one or more filler bits.

Aspect 22: The method of aspect 21, further comprising: transmitting radio resource configuration information that indicates a fixed size of the HARQ codebook.

Aspect 23: The method of any of aspects 20 through 22, further comprising: configuring the HARQ codebook to be a first type of codebook; determining that the one or more feedback messages of the first type each include a respective set of identical feedback messages of the first type based at least in part on configuring the HARQ codebook to be the first type of codebook, wherein each feedback message of the first type in the respective set comprises the first quantity of bits, and wherein the respective set of identical feedback messages collectively comprises the second quantity of bits and is included in the HARQ codebook; and decoding the one or more feedback messages of the first type based at least in part on determining that the one or more feedback messages of the first type each include a respective set of identical feedback messages of the first type.

Aspect 24: The method of any of aspects 20 through 23, further comprising: configuring the HARQ codebook to be a first type of codebook; transmitting a grant for a downlink transmission occasion; and receiving, in the HARQ codebook, a discontinuous communication message associated with the downlink transmission occasion, wherein the discontinuous communication message comprises the second quantity of bits regardless of whether the downlink transmission occasion is associated with the first HARQ configuration or the second HARQ configuration.

Aspect 25: The method of any of aspects 20 through 24, further comprising: configuring the HARQ codebook to be a first type of codebook; and transmitting a grant for a user equipment to transmit an uplink transmission via an uplink shared channel, wherein the grant includes an indicator for the user equipment to transmit the HARQ codebook via the uplink shared channel.

Aspect 26: The method of aspect 20, further comprising: configuring the HARQ codebook to be a second type of codebook; receiving, as part of the HARQ codebook, a first sub-codebook for each downlink transmission in the first set of downlink transmissions, the first sub-codebook comprising a respective feedback message of the first type for each downlink transmission in the first set of downlink transmissions; and receiving, as part of the HARQ codebook, a second sub-codebook for each downlink transmission in the second set of downlink transmissions, the second sub-codebook comprising a respective feedback message of the second type for each downlink transmission in the second set of downlink transmissions, wherein the first-sub-codebook and the second sub-codebook are concatenated.

Aspect 27: The method of aspect 26, further comprising: transmitting DCI that indicates one of the first HARQ configuration or the second HARQ configuration for each downlink transmission in one of the first set of downlink transmissions or the second set of downlink transmissions.

Aspect 28: The method of any of aspects 26 through 27, further comprising: transmitting, for each downlink transmission in one of the first set of downlink transmissions or the second set of downlink transmissions, a respective DAI, wherein DAIs associated with the second set of downlink transmissions are incremented independent of DAIs associated with the first set of downlink transmissions.

Aspect 29: The method of any of aspects 26 through 28, further comprising: transmitting DCI that indicates a size of the first sub-codebook and a size of the second sub-codebook.

Aspect 30: The method of any of aspects 26 through 29, further comprising: transmitting a grant for a user equipment to transmit an uplink transmission via an uplink shared channel, wherein the grant includes a first indicator that indicates a size of the first sub-codebook and a second indicator that indicates a size of the second sub-codebook, wherein the HARQ codebook is received via the uplink shared channel based at least in part on the grant for the uplink transmission.

Aspect 31: The method of any of aspects 20 through 30, further comprising: receiving, in the one or more feedback messages of the first type and for each downlink transmission in the first set of downlink transmissions, a respective set of first feedback bits that comprises the first quantity of one or more bits and is included in the one or more feedback messages of the first type; and receiving, in the one or more feedback messages of the first type and for each downlink transmission in the second set of downlink transmissions, a respective set of second feedback bits that comprises the second quantity of one or more bits and is included in the one or more feedback messages of the second type.

Aspect 32: The method of any of aspects 20 through 31, further comprising: transmitting, via DCI or RRC information, an indication of whether a user equipment may include the one or more feedback messages of the first type and one or more feedback messages of the second type in a same HARQ codebook.

Aspect 33: The method of any of aspects 20 through 32, further comprising: transmitting a third set of one or more downlink transmissions associated with a third HARQ configuration, wherein the third HARQ configuration corresponds to a third type of feedback message; transmitting scheduling information to the UE; and receiving, in response to the third set of downlink transmissions and the scheduling information, a second HARQ codebook that comprises one or more feedback messages of the third type, wherein the second HARQ codebook is transmitted separately from the HARQ codebook.

Aspect 34: The method of any of aspects 20 through 33, wherein the first set of downlink transmissions is transmitted over a first carrier associated with the first HARQ configuration; and the second set of downlink transmissions is transmitted over a second carrier associated with the second HARQ configuration.

Aspect 35: The method of any of aspects 20 through 34, wherein the first type of feedback message and the second type of feedback message comprise a same type of feedback message that comprises acknowledgement information and CQI.

Aspect 36: The method of any of aspects 20 through 34, wherein a feedback message of the first type comprises acknowledgement information; and a feedback message of the second type comprises acknowledgement information and CQI.

Aspect 37: An apparatus for wireless communication at a UE, comprising a processor; memory coupled with the processor; and instructions stored in the memory and executable by the processor to cause the apparatus to perform a method of any of aspects 1 through 19.

Aspect 38: An apparatus for wireless communication at a UE, comprising at least one means for performing a method of any of aspects 1 through 19.

Aspect 39: A non-transitory computer-readable medium storing code for wireless communication at a UE, the code comprising instructions executable by a processor to perform a method of any of aspects 1 through 19.

Aspect 40: An apparatus for wireless communication at a base station, comprising a processor; memory coupled with the processor; and instructions stored in the memory and executable by the processor to cause the apparatus to perform a method of any of aspects 20 through 35.

Aspect 41: An apparatus for wireless communication at a base station, comprising at least one means for performing a method of any of aspects 20 through 35.

Aspect 42: A non-transitory computer-readable medium storing code for wireless communication at a base station, the code comprising instructions executable by a processor to perform a method of any of aspects 20 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first set of downlink transmissions comprising one or more first downlink transmissions associated with a first hybrid automatic repeat request configuration, wherein the first hybrid automatic repeat request configuration corresponds to a first type of feedback message associated with a first quantity of one or more bits;
   receiving a second set of downlink transmissions comprising one or more second downlink transmissions associated with a second hybrid automatic repeat request configuration, wherein the second hybrid automatic repeat request configuration corresponds to a second type of feedback message that comprises channel information and is associated with a second quantity of multiple bits;
   receiving an indication of whether one or more feedback messages of the first type and one or more feedback messages of the second type are to be included in a same hybrid automatic repeat request codebook; and
   transmitting, in response to the first set of downlink transmissions and the second set of downlink transmissions, a hybrid automatic repeat request codebook that comprises the one or more feedback messages of the first type and the one or more feedback messages of the second type, wherein transmitting the hybrid automatic repeat request codebook is based at least in part on the indication.

2. The method of claim 1, wherein the hybrid automatic repeat request codebook is a first type of codebook, the method further comprising:
   generating, for each downlink transmission in the first set of downlink transmissions, a respective set of one or more filler bits, wherein the respective set of one or more filler bits comprises a third quantity of one or more filler bits that is equal to a difference between the second quantity and the first quantity, the second quantity greater than the first quantity; and including each generated set of one or more filler bits in the hybrid automatic repeat request codebook.

3. The method of claim 2, wherein the first set of downlink transmissions and the second set of downlink transmissions are received via a same downlink serving cell that supports the first hybrid automatic repeat request configuration and the second hybrid automatic repeat request configuration, the method further comprising:
generating the respective set of one or more filler bits based at least in part on the first set of downlink transmissions and the second set of downlink transmissions being received via the same downlink serving cell that supports the first hybrid automatic repeat request configuration and the second hybrid automatic repeat request configuration.

4. The method of claim 2, further comprising:
receiving radio resource configuration information identifying a fixed size of the hybrid automatic repeat request codebook.

5. The method of claim 1, wherein the hybrid automatic repeat request codebook is a first type of codebook, the method further comprising:
generating, for each downlink transmission in the first set of downlink transmissions, a respective set of identical feedback messages of the first type, wherein each feedback message of the first type in the respective set comprises the first quantity of bits, and wherein the respective set of identical feedback messages collectively comprises the second quantity of bits and is included in the hybrid automatic repeat request codebook.

6. The method of claim 1, wherein the hybrid automatic repeat request codebook is a first type of codebook, the method further comprising:
identifying a failure to decode a grant for a downlink transmission occasion;
generating, for the downlink transmission occasion, a respective discontinuous communication message that comprises the second quantity of bits regardless of whether the downlink transmission occasion is associated with the first hybrid automatic repeat request configuration or the second hybrid automatic repeat request configuration; and
including the respective discontinuous communication message in the hybrid automatic repeat request codebook.

7. The method of claim 1, wherein the hybrid automatic repeat request codebook is a first type of codebook, the method further comprising:
receiving a grant for an uplink transmission via an uplink shared channel, wherein the hybrid automatic repeat request codebook is transmitted via the uplink shared channel based at least in part on an indicator included in the grant for the uplink transmission.

8. The method of claim 1, wherein the hybrid automatic repeat request codebook is a second type of codebook, the method further comprising:
generating a first sub-codebook for each downlink transmission in the first set of downlink transmissions, the first sub-codebook comprising a respective feedback message of the first type for each downlink transmission in the first set of downlink transmissions;
generating a second sub-codebook for each downlink transmission in the second set of downlink transmissions, the second sub-codebook comprising a respective feedback message of the second type for each downlink transmission in the second set of downlink transmissions; and
concatenating the first sub-codebook and the second sub-codebook, wherein transmitting the hybrid automatic repeat request codebook is based at least in part on the concatenating.

9. The method of claim 8, further comprising:
identifying, based at least in part on corresponding downlink control information, each downlink transmission in one of the first set of downlink transmissions or the second set of downlink transmissions as associated with one of the first hybrid automatic repeat request configuration or the second hybrid automatic repeat request configuration.

10. The method of claim 8, further comprising:
receiving, for each downlink transmission in one of the first set of downlink transmissions or the second set of downlink transmissions, a respective downlink assignment indicator; and
incrementing downlink assignment indicators associated with the second set of downlink transmissions independent of downlink assignment indicators associated with the first set of downlink transmissions.

11. The method of claim 8, further comprising:
receiving downlink control information identifying a size of the first sub-codebook and a size of the second sub-codebook; and
determining a size of the hybrid automatic repeat request codebook as equal to a sum of the size of the first sub-codebook and the size of the second sub-codebook.

12. The method of claim 8, further comprising:
receiving a grant for an uplink transmission via an uplink shared channel, wherein the grant for the uplink transmission includes a first indicator that indicates a size of the first sub-codebook and a second indicator that indicates a size of the second sub-codebook; and
determining a size for the hybrid automatic repeat request codebook based at least in part on the first indicator and the second indicator, wherein the hybrid automatic repeat request codebook is transmitted via the uplink shared channel based at least in part on the grant for the uplink transmission.

13. The method of claim 1, further comprising:
generating, for each downlink transmission in the first set of downlink transmissions, a respective set of first feedback bits, wherein the respective set of first feedback bits comprises the first quantity of bits and is included in the one or more feedback messages of the first type; and
generating, for each downlink transmission in the second set of downlink transmissions, a respective set of second feedback bits, wherein the respective set of second feedback bits comprises the second quantity of bits and is included in the one or more feedback messages of the second type.

14. The method of claim 1, further comprising:
receiving a third set of downlink transmissions comprising one or more third downlink transmissions associated with a third hybrid automatic repeat request configuration, wherein the third hybrid automatic repeat request configuration corresponds to a third type of feedback message;
receiving scheduling information;
generating, in response to the third set of downlink transmissions and the scheduling information, a second hybrid automatic repeat request codebook that comprises one or more feedback messages of the third type; and transmitting the second hybrid automatic repeat request codebook, wherein the second hybrid automatic repeat request codebook is transmitted separately from the hybrid automatic repeat request codebook.

15. The method of claim 1, wherein:
the first set of downlink transmissions is received over a first carrier associated with the first hybrid automatic repeat request configuration; and
the second set of downlink transmissions is received over a second carrier associated with the second hybrid automatic repeat request configuration.

16. The method of claim 1, wherein the first type of feedback message and the second type of feedback message comprise a same type of feedback message that comprises acknowledgement information and channel quality information.

17. The method of claim 1, wherein:
a feedback message of the first type comprises acknowledgement information; and
a feedback message of the second type comprises acknowledgement information and channel quality information.

18. The method of claim 1, wherein the hybrid automatic repeat request codebook is transmitted within a single transmission time interval.

19. A method for wireless communication at a network entity, comprising:
transmitting a first set of downlink transmissions comprising one or more first downlink transmissions associated with a first hybrid automatic repeat request configuration, wherein the first hybrid automatic repeat request configuration corresponds to a first type of feedback message associated with a first quantity of one or more bits;
transmitting a second set of downlink transmissions comprising one or more second downlink transmissions associated with a second hybrid automatic repeat request configuration, wherein the second hybrid automatic repeat request configuration corresponds to a second type of feedback message that comprises channel information and is associated with a second quantity of multiple bits;
transmitting an indication of whether one or more feedback messages of the first type and one or more feedback messages of the second type are to be included in a same hybrid automatic repeat request codebook; and
receiving, in response to the first set of downlink transmissions and the second set of downlink transmissions, a hybrid automatic repeat request codebook that comprises the one or more feedback messages of the first type and the one or more feedback messages of the second type.

20. The method of claim 19, further comprising:
configuring the hybrid automatic repeat request codebook to be a first type of codebook;
transmitting radio resource configuration information that indicates a fixed size of the hybrid automatic repeat request codebook based at least in part on configuring the hybrid automatic repeat request codebook to be the first type of codebook;
determining that the one or more feedback messages of the first type each include a respective set of one or more filler bits based at least in part on configuring the hybrid automatic repeat request codebook to be the first type of codebook, wherein the respective set of one or more filler bits comprises a third quantity of one or more filler bits that is equal to a difference between the second quantity and the first quantity, the second quantity greater than the first quantity; and
decoding the one or more feedback messages of the first type based at least in part on determining that the one or more feedback messages of the first type each include a respective set of one or more filler bits.

21. The method of claim 19, further comprising:
configuring the hybrid automatic repeat request codebook to be a first type of codebook;
determining that the one or more feedback messages of the first type each include a respective set of identical feedback messages of the first type based at least in part on configuring the hybrid automatic repeat request codebook to be the first type of codebook, wherein each feedback message of the first type in the respective set comprises the first quantity of bits, and wherein the respective set of identical feedback messages collectively comprises the second quantity of bits and is included in the hybrid automatic repeat request codebook; and
decoding the one or more feedback messages of the first type based at least in part on determining that the one or more feedback messages of the first type each include the respective set of identical feedback messages of the first type.

22. The method of claim 19, further comprising:
configuring the hybrid automatic repeat request codebook to be a first type of codebook;
transmitting a grant for a downlink transmission occasion; and
receiving, in the hybrid automatic repeat request codebook, a discontinuous communication message associated with the downlink transmission occasion, wherein the discontinuous communication message comprises the second quantity of bits regardless of whether the downlink transmission occasion is associated with the first hybrid automatic repeat request configuration or the second hybrid automatic repeat request configuration.

23. The method of claim 19, further comprising:
configuring the hybrid automatic repeat request codebook to be a second type of codebook;
receiving, as part of the hybrid automatic repeat request codebook, a first sub-codebook for each downlink transmission in the first set of downlink transmissions, the first sub-codebook comprising a respective feedback message of the first type for each downlink transmission in the first set of downlink transmissions; and
receiving, as part of the hybrid automatic repeat request codebook, a second sub-codebook for each downlink transmission in the second set of downlink transmissions, the second sub-codebook comprising a respective feedback message of the second type for each downlink transmission in the second set of downlink transmissions, wherein the first sub-codebook and the second sub-codebook are concatenated.

24. The method of claim 23, further comprising:
transmitting, for each downlink transmission in one of the first set of downlink transmissions or the second set of downlink transmissions, a respective downlink assignment indicator, wherein downlink assignment indicators associated with the second set of downlink transmissions are incremented independent of downlink assignment indicators associated with the first set of downlink transmissions.

25. The method of claim 23, further comprising:
transmitting downlink control information that indicates a size of the first sub-codebook and a size of the second sub-codebook.

26. The method of claim 19, wherein the first type of feedback message and the second type of feedback message comprise a same type of feedback message that comprises acknowledgement information and channel quality information.

27. An apparatus for wireless communication comprising:
at least one processor of a user equipment (UE), the at least one processor coupled with the memory and the transceiver and configured to:
receive a first set of downlink transmissions comprising one or more first downlink transmissions associated with a first hybrid automatic repeat request configuration, wherein the first hybrid automatic repeat request configuration corresponds to a first type of feedback message associated with a first quantity of one or more bits;
receive a second set of downlink transmissions comprising one or more second downlink transmissions associated with a second hybrid automatic repeat request configuration, wherein the second hybrid automatic repeat request configuration corresponds to a second type of feedback message that comprises channel information and is associated with a second quantity of multiple bits;
receive an indication of whether one or more feedback messages of the first type and one or more feedback messages of the second type are to be included in a same hybrid automatic repeat request codebook; and
transmit, in response to the first set of downlink transmissions and the second set of downlink transmissions, a hybrid automatic repeat request codebook that comprises the one or more feedback messages of the first type and the one or more feedback messages of the second type, wherein transmitting the hybrid automatic repeat request codebook is based at least in part on the indication.

28. An apparatus for wireless communication comprising:

memory; and at least one processor of a network entity, the at least one processor coupled with the memory and configured to:
transmit a first set of downlink transmissions comprising one or more first downlink transmissions associated with a first hybrid automatic repeat request configuration, wherein the first hybrid automatic repeat request configuration corresponds to a first type of feedback message associated with a first quantity of one or more bits;
transmit a second set of downlink transmissions comprising one or more second downlink transmissions associated with a second hybrid automatic repeat request configuration, wherein the second hybrid automatic repeat request configuration corresponds to a second type of feedback message that comprises channel information and is associated with a second quantity of multiple bits;
transmit an indication of whether one or more feedback messages of the first type and one or more feedback messages of the second type are to be included in a same hybrid automatic repeat request codebook; and
receive, in response to the first set of downlink transmissions and the second set of downlink transmissions, a hybrid automatic repeat request codebook that comprises the one or more feedback messages of the first type and the one or more feedback messages of the second type.

* * * * *